US008145468B2

(12) United States Patent
Fritzsche et al.

(10) Patent No.: US 8,145,468 B2
(45) Date of Patent: Mar. 27, 2012

(54) NON-INTRUSIVE MODEL ANNOTATION

(75) Inventors: Mathias Fritzsche, Neukirchen (DE); Wasif Gilani, Wavecrest (GB)

(73) Assignee: SAP AG, Walldorf (DE)

( * ) Notice: Subject to any disclaimer, the term of this patent is extended or adjusted under 35 U.S.C. 154(b) by 852 days.

(21) Appl. No.: 12/239,713

(22) Filed: Sep. 26, 2008

(65) Prior Publication Data
US 2010/0083212 A1 Apr. 1, 2010

(51) Int. Cl.
G06F 9/45 (2006.01)
G06F 9/455 (2006.01)
(52) U.S. Cl. .......................................... 703/22; 715/239
(58) Field of Classification Search .................. None
See application file for complete search history.

(56) References Cited

U.S. PATENT DOCUMENTS
2009/0132562 A1 5/2009 Mehr et al.

OTHER PUBLICATIONS

Balsame et al. "Model-Based Performance Prediction in Software Development: A Survey", IEEE Transactions on Software Engineering, vol. 30, No. 5, May 2004, pp. 295-310.*
Lockermann, P. "Collaborative Software Development: A Case Study of Model Interdependencies", UNISCON 2008, Apr. 22-25, 2008, pp. 232-245.*
Petriu et al. "Applying the UML PErformance PRofile: Graph Grammer-Based Derivation of LQN Models from UML Speicifcations", TOOLS 2002, pp. 159-177.*
Vanhooff et al. "Breaking Up the Transformation Chain", 2005, 5 pages.*
"Aspectj crosscutting object for better modularity", Retrieved on Nov. 20, 2007, 4 pages. Available at: http://web.archive.org/web/20070105030648/http://www.eclipse.org/aspectj/.
"Event-driven process chain", Wikipedia, Retrieved on Nov. 26, 2007, 4 pages. Available at: http://en.wikipedia.org/wiki/Event-driven_Process_Chains.
Extended European Search Report received for the European Patent Application No. 08012510.7, mailed on Mar. 2, 2009, pp. 1-6.
"Home of Fundamental Modeling Concepts", Retrieved on Nov. 26, 2007, 1 page. Available at: http://www.fmc-modeling.org/.
Abouzahra, Anas, et al., "A Practical Approach to Bridging Domain Specific Languages with UML Profiles", Proceedings of the Best practices for model driven software development at OOPSLA, San Diego, vol. 5, Oct. 16, 2005, pp. 1-8.
Gertz, Michael, "Oracle/SQL Tutorial", Revised Version 1.01, Jan. 2000, 66 pages.
Heckel, Reiko et al., "Towards a UML Profile for Service-Oriented Architectures", Preprint submitted to Elsevier Science, Jun. 20, 2003, pp. 1-6.
Johnston, Simon, "UML 2.0 Profile for Software Services Pragmatic Modeling for SOA", IBM Rational, 2006, 22 pages.

(Continued)

*Primary Examiner* — Suzanne Lo
(74) *Attorney, Agent, or Firm* — Brake Hughes Bellerman LLP

(57) ABSTRACT

Development models of software applications may be annotated with additional information and transformed within a transformation chain into a resulting model that may be used to evaluate the development model, for example, for simulation and/or performance support of the development model. By relating elements of the development model through the transformation chain to elements of the resulting model, the evaluation may be performed with respect to the resulting/transformed model, but provided to a user in terms of the original development model. In this way, a user of the development model may work with the more-familiar development model, without having to alter the development model directly in order to obtain the evaluation.

20 Claims, 16 Drawing Sheets

OTHER PUBLICATIONS

Jouault, Frederic, et al., "Transforming Models with ATL", Satellite Events at the models 2005 Conference Lecture Notes in Computer science, LNCS, Springler, Berlin, DE, ATLAS Group, INRIA & LINA, University of Nantes, vol. 3844, Jan. 1, 2006, 30 pages.

Juerjens, Jan, "Using UMLsec and goal trees for secure systems development", Proceedings of the 2002 ACM symposium on Applied computing, 2002, 5 pages.

Riva, Cladio, et al., "UML-based reverse engineering and model analysis approaches for software architecture maintenance", Proceedings of the 20th IEEE International Conference on Software Maintenance, Sep. 11, 2004, pp. 1-10.

Vaziri, Mandana, et al., "Some Shortcomings of OCL, the Object Constraint Language of UML", MIT Laboratory for Computer Science, Dec. 7, 1999, pp. 1-17.

Zhu, Liming, et al., "UML Profiles for Design Decisions and Non-Functional Requirements", 53rd Second Workshop on Sharing and Reusing Architectural Knowledge—Architecture, Rationale, and Design Intent, SHARK/ADI '07: ICSE Workshops 2007, SHARK/ADI, May 2007, 7 pages.

Mantell, Keith, "From UML to BPEL, Model Driven Architecture in a Web Services World", DeveloperWorks, Sep. 9, 2003, 9 pages.

Houmb, Siv Hilde, et al., "Toward a UML Profile for Model-Based Risk Assessment", Telenor R & D, Norway, 2002, 12 pages.

Greenfield, Jack, "UML profile for EJB", Public Draft, Rational Software Corporation, May 25, 2001, pp. 1-75.

Inverardi, P., et al., "Performance Evaluation of a Software Architecture: A Case Study", 1998, 10 pages.

"OMG Unified Modeling Language (OMG UML), Superstructure, V2.1.2", Nov. 2007, 738 pages.

"Unified Modeling Language: Superstructure", OMG, Version 2.1.1 (with Change Bars), Feb. 3, 2007, 732 pages.

"Unified Modeling Language (UML) Specification: Infrastructure", OMG, Version 2.0, Finalized Convenience Document, Nov. 2004, 226 pages.

"ATL: Atlas Transformation Language", Atlas Group Lina & Inria Nantes, ATL User Manual—version 0.7, Feb. 2006, 48 pages.

* cited by examiner

```
package MODIFICATIONCONSTRAINTS (
    class AnnotationModel extends WModel {
        -- @subsets ownedElement
        reference contents[*] ordered container: Annotation;
        -- @subsets wovenModel
        reference referencedModel container: AnnotatedModel;
    }
    -- @welementRefType AnnotatedModelElementRef
    class AnnotatedModel extends VModelRef {
    }
    -- @wmodelRefType AnnotatedModel
    class AnnotatedModelElementRef extends WElementRef {
    }
    -- @begin ANNOTATIONS
    abstract class Annotation extends WLink {
        reference properties[*] ordered container: ModificationConstraintAnnotation;
        -- @subsets end
        reference annotatedModelElement container: AnnotatedModelElement;
    }
    class AnnotatedModelElement extends WLinkEnd {
    }
    -- @end ANNOTATIONS
    -- @begin MODIFICATION CONSTRAINT ANNOTATIONS
    abstract class ModificationConstraintAnnotation {
        attribute key: String;
    }
    class ResourceDemandsConstraint extends ModificationConstraintAnnotation {
        attribute min_value [0-1]: integer;
        attribute max_value [0-1]: integer;
    }
    class ResourceMappingConstraint extends ModificationConstraintAnnotation {
        attribute value: String;
    }
    -- @end MODIFICATION CONSTRAINT ANNOTATIONS
    -- @end ANNOTATIONS
}
package PrimitiveTypes {
    datatype Boolean;
    datatype Integer;
    datatype String;
}
```

*FIG. 12*

```xml
<?xml version="1.0" encoding="ASCII"?>
-<AnnotationModel kmi: version="2.0" xmlns: xmi= "http://www.omg.org/XMI"
    xmlns: ksi = "http://www.w3.org/2001/XMLSchema-instance" kmlns="mmw_annotation"
    xmi: id = "AnnotationModel1">
  -<contents xmi:id="Annotation1">
      <properties key="Customer_ResourceMappingConstraint1" min_value="50" max_value="50"/>
      <AnnotatedModelElement xmi:id= "AnnotatedModelElement1" name="Customer"
          element="//@referencedModel/@ownedElementRef.0"/>
    </contents>
  -<contents xmi:id="Annotation2">
      <properties key="Customer_ResourceDemandsConstraint1" value="fixed"/>
      <annotatedModelElement xmi:id= "AnnotatedModelElement1" name="Customer"
          element="//@referencedModel/@ownedElementRef.0"/>
    </contents>
  -<contents xmi:id="Annotation3">
      <properties key="SalesProcessing_ResourceMappingConstraint1" min_value="20"
          max_value="20"/>
      <AnnotatedModelElement xmi:id= "AnnotatedModelElement2" name="SalesProcessing"
          element="//@referencedModel/@ownedElementRef.1"/>
    </contents>

-<contents xmi:id="Annotation4">
      <properties key="SalesProcessing_ResourceDemandsConstraint1" value="changeable"/>
      <AnnotatedModelElement xmi:id= "AnnotatedModelElement2" name="SalesProcessing"
          element="//@referencedModel/@ownedElementRef.1"/>
    </contents>
  -<contents xmi:id="Annotation5">
      <properties key="Production_ResourceMappingConstraint1" min_value="15" max_value="17"/>
      <annotatedModelElement xmi:id= "AnnotatedModelElement3" name="Production"
          element="//@referencedModel/@ownedElementRef.2"/>
    </contents>
  -<contents xmi:id="Annotation6">
      <properties key="Production_ResourceDemandsConstraint1" value="fixed"/>
      <annotatedModelElement xmi:id= "AnnotatedModelElement3" name="Production"
          element="//@referencedModel/@ownedElementRef.2"/>
    </contents>
  -<referencedModel xmi:id= "AnnotatedModel1" name="referencedModel"
      ref="/ModificationConstraintAnnotation/models/SourceModel.ecore">
      <ownedElementRef ksi:type= "AnnotatedModelElementRef" name="ref_Customer"
          ref="//@processcomponent.0"/>
      <ownedElementRef ksi:type= "AnnotatedModelElementRef" name="ref_SalesProcessing"
          ref="//@processcomponent.1"/>
      <ownedElementRef ksi:type= "AnnotatedModelElementRef" name="ref_Production"
          ref="//@processcomponent.2"/>
    </referencedModel>
</AnnotationModel>
```

*FIG. 13A*

| DEPARTMENT | RESOURCE MAPPING CONSTRAINT | RESOURCE DEMANDS CONSTRAINT |
|---|---|---|
| CUSTOMER | MINMULTIPLICITY=50 MAXMULTIPLICITY=50 | VALUE=FIXED |
| SALES PROCESSING | MINMULTIPLICITY=20 MAXMULTIPLICITY=20 | VALUE=CHANGEABLE |
| PRODUCTION | MINMULTIPLICITY=15 MAXMULTIPLICITY=17 | VALUE=FIXED |

*FIG. 13B*

NON-INTRUSIVE MODEL ANNOTATION

TECHNICAL FIELD

This description relates to model-based processes.

BACKGROUND

Model-driven engineering and related concepts relate, for example, to the use of formalized models to design, manage, implement, and modify software applications and other processes. Such models provide a formalized abstraction of desired software properties and behaviors, and this abstraction provides, among other benefits, an ability of a designer or other user to understand, explain, create, or implement the software application(s) in a manner that is consistent, logical, and efficient.

In theory, then, such development models may be modified as-needed to obtain a desired result. At times, however, it may be useful or desirable to use a development model that (in whole or in part) should not, or must not, be modified. For example, a developer may use a development model that is vender-specific/vender-confidential in whole or in part, and therefore the developer may not have the necessary levels of access to modify the development model. In another example, a developer may use tools to extend a development model, e.g., to add functionality to an existing development model and associated software application. In such cases, it may be undesirable or impossible to modify some or all of the resulting, extended development model.

In particular, it is possible to modify development models (e.g., to modify associated development meta-models) to add annotations which may be used to better understand or implement the development models. For example, such annotations may be related to a desired performance or security level(s) of the development model, or individual elements thereof. However, in the cases such as those just mentioned where the development model should or must not be modified, it may be difficult or impossible to add such annotations to gain the advantages related thereto.

SUMMARY

According to one general aspect, an annotation engine may be configured to input a development model of a software application and associate annotations with elements of the development model, and may be configured to provide links between each annotation and its associated element to thereby output a composition model. A transformation manager may be configured to coordinate at least two transformation engines within a transformation chain, each transformation engine associated with an input model and a transformed model. At least one of the transformation engines may be configured to receive the composition model in association with a corresponding input model and output an annotated, transformed model based thereon. A trace model manager may be configured to coordinate at least two trace model generators for generating trace models. Each trace model may be associated with a corresponding transformation engine and may relate source elements of a corresponding input model to target elements of a corresponding transformed model. The trace model manager may be configured to track a relationship between each of the at least two trace models and each corresponding input model and transformed model. A simulation manager may be configured to execute a simulator associated with one of the at least two transformation engines and may be configured to receive a corresponding transformed model therefrom as a simulation model, based on the annotated, transformed model, and may be configured to output a simulation of the simulation model including simulation results. The trace manager may be configured to associate elements of the simulation with elements of the development model, to thereby provide a simulation of the development model in which the simulation results are provided in the context of the development model.

According to another general aspect, a computer program product may be tangibly embodied on a computer-readable medium and may include executable code that, when executed, is configured to cause at least one data processing apparatus to perform the following operations. Specifically, may cause the data processing apparatus to input a development model of a software application and associate annotations with elements of the development model, and provide links between each annotation and its associated element to obtain a composition model. The instructions may further cause the data processing apparatus to coordinate at least two transformation engines within a transformation chain, each transformation engine being associated with an input model and a transformed model, wherein at least one of the transformation engines may be configured to receive the composition model in association with a corresponding input model and output an annotated, transformed model based thereon. The instructions may cause the data processing apparatus to coordinate at least two trace model generators for generating trace models, each trace model associated with a corresponding transformation engine and relating source elements of a corresponding input model to target elements of a corresponding transformed model. The instructions may cause the data processing apparatus to track relationships between each of the at least two trace models and each corresponding input model and transformed model, and to execute a simulator associated with one of the at least two transformation engines and configured to receive a corresponding transformed model therefrom as a simulation model, based on the annotated, transformed model, and configured to output a simulation of the simulation model including simulation results. The instructions may cause the data processing apparatus to associate elements of the simulation with elements of the development model, using the relationships, and provide a simulation of the development model in which the simulation results are provided in the context of the development model.

According to another general aspect, a method may include receiving a development model of a software application and associate annotations with elements of the development model, and providing links between each annotation and its associated element to obtain a composition model. The method may include coordinating at least two transformation engines within a transformation chain, each transformation engine associated with an input model and a transformed model, wherein at least one of the transformation engines is configured to receive the composition model in association with a corresponding input model and output an annotated, transformed model based thereon. The method may include coordinating at least two trace model generators for generating trace models, each trace model associated with a corresponding transformation engine and relating source elements of a corresponding input model to target elements of a corresponding transformed model. The method may include tracking relationships between each of the at least two trace models and each corresponding input model and transformed model, and executing a simulator associated with one of the at least two transformation engines and configured to receive a corresponding transformed model therefrom as a simulation model, based on the annotated, transformed model, and configured to output a simulation of the simulation model including simulation results. The method may include associating elements of the simulation with elements of the development model, using the relationships, and providing a simulation of the development model in which the simulation results are provided in the context of the development model.

According to another general aspect, a system may include an annotation engine configured to input a development model of a software application and associate annotations with elements of the development model, and configured to provide links between each annotation and its associated element to thereby output a composition model, a transformation manager configured to coordinate transformation engines within a transformation chain, each transformation engine configured to transform the development model, or subsequent transformations thereof, into a transformed model, and an evaluation engine configured to receive the composition model and an output model of the transformation chain, and configured to determine a relation of the output model to the development model for evaluation of the development model therewith.

The details of one or more implementations are set forth in the accompanying drawings and the description below. Other features will be apparent from the description and drawings, and from the claims.

BRIEF DESCRIPTION OF THE DRAWINGS

FIG. 12 is a screenshot illustrating a portion of a meta-model for the composition model of FIG. 1.

FIGS. 13A and 13B are screenshots of a modification constraint model of FIG. 4 and the expressed content thereof, respectively.

DETAILED DESCRIPTION

Figure 1:
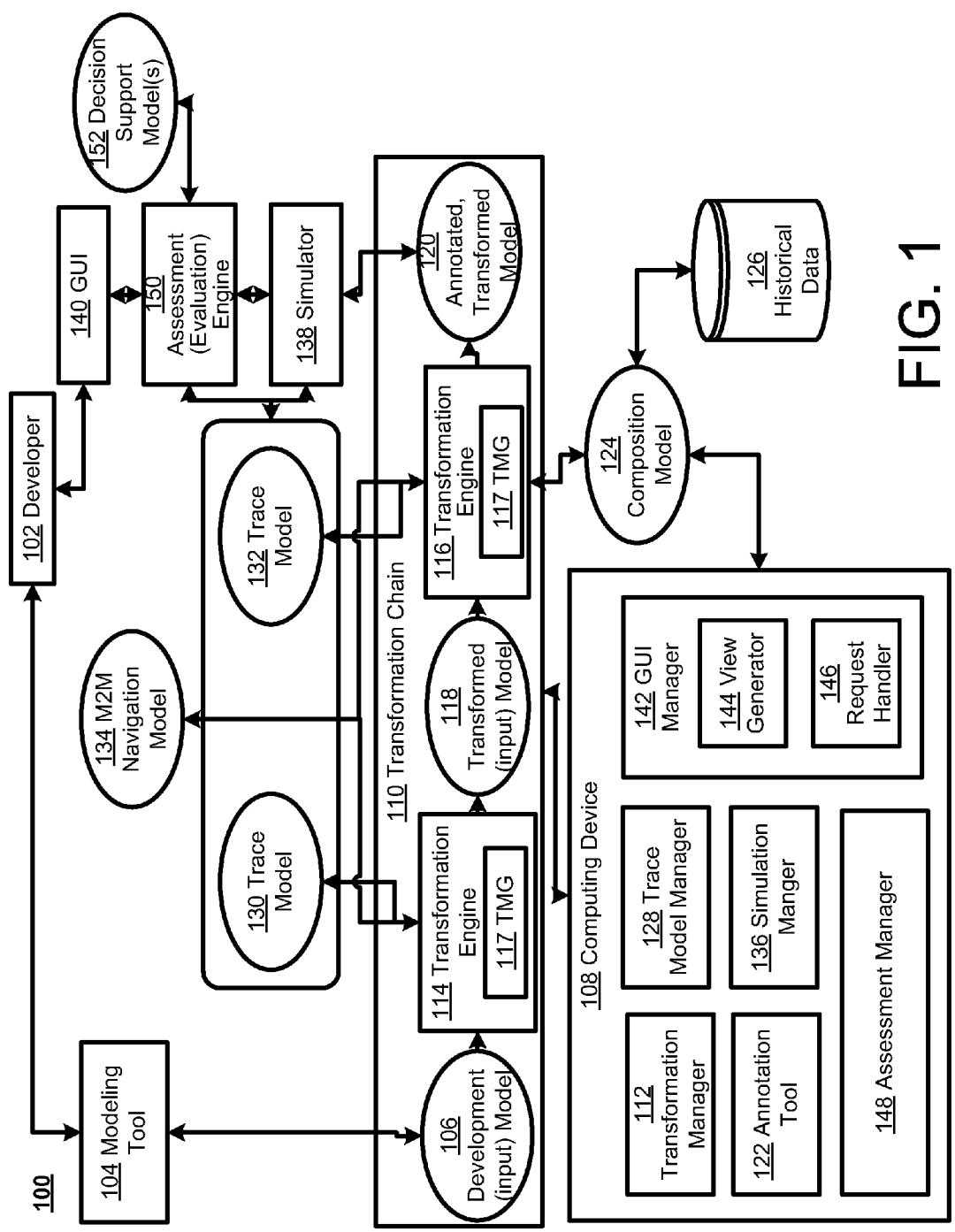
FIG. 1 is a block diagram of a system for annotation of models for performance decision support in model-driven engineering.

FIG. 1 is a block diagram of a system 100 for annotation of models for, among other functionalities, performance decision support in model-driven engineering. In the example of FIG. 1, the system 100 allows a software developer 102 to annotate a development model (or an extended development model), and to thereby better understand and/or implement the development model and associated software application in a straight-forward manner, without having to directly modify the development model to do so. For example, such annotations may be related to a desired performance, security level, or other feature or characteristic of the development model and associated software application. In the system of FIG. 1, even though the development model is not modified directly, the annotations may nonetheless be used for their intended purpose(s), e.g., providing performance support, as if the development model had been modified directly. Thus, the developer is provided with the convenience of working with familiar elements of the development model, without having to modify the development model to do so.

In FIG. 1, the developer 102 uses a modeling tool 104 to design development model, such as a development model 106 of FIG. 1. The modeling tool 104, except as described differently herein, may contain various necessary conventional elements used to create development models, such as a graphical user interface (GUI) used to create or select (e.g., through drag-and-drop techniques) one or more shapes associated with nodes of the development models (e.g., activity nodes, execution nodes, or decision/control nodes, the latter including, for example, split/join, synchronize, fork, loop, and other known constructs for controlling a flow and execution order of the development model, along with tools to join the various nodes using branches to obtain the desired execution order). One example of the modeling tool 104 is the Eclipse Modeling Framework (EMF), which provides many different modeling tools, along with an extension capability that allows users to add functionalities in the form of plug-ins that may be used within the framework.

In FIG. 1, the term development model may refer to virtually any model used to design and implement software-based applications or processes. Specifically, the term development model may be used to refer to the use of the system 100 in a software development (e.g., creation or design) context. Of course, it may be appreciated that the development model ultimately may be saved and deployed in association with a fully-tested and released software application that is no longer under active development, and yet the system 100 may still be used in such a context, e.g., if further performance demands warrant. In addition, as described herein (e.g., with respect to FIG. 3), the development model 106 may include an underlying development model together with an extension thereof that is associated with new or additional functionality.

The development model 106 may represent one or more technical models describing operations of software applications written in a particular language (e.g., Java), or may be models describing software processes governing business or other human-implemented activities (e.g., workflow process models that issue directions and receive responses from machine or human actors implementing steps of the process model). The development models may be described as Unified Modeling Language (UML) models, or as one of many other modeling languages, where non-limiting examples of other such modeling languages may include the Business Process Modeling Notation (BPMN), Business Process Execution Language (BPEL), Web Services BPEL (WSB-PEL), Event-Driven Process Chain(s) languages, and languages in the area of Fundamental Modeling Concepts. In addition, many proprietary or specialty languages may exist.

As described herein, the development model 106 may be large, detailed, and complex; moreover, the development model 106 may be proprietary or otherwise unable or undesirable to be modified (e.g., annotated). Further, there may exist a number of issues associated with the development model 106 which may result in an undesired or insufficient performance thereof. For example, the developer 102 may simply make a mistake, e.g., in assigning too few resources to a particular task or set of tasks, or make some other error that results in unsatisfactory performance. Given that a particular development model may be large and complex, as just referenced, it may be difficult for the developer 102 to determine the source of the unsatisfactory performance, and/or to determine a correction or improvement to obtain satisfactory performance.

In particular, it may occur that a development model is associated with a layered software application, e.g., an enterprise service architecture (ESA) or other architecture which builds more complicated, more user-friendly, and/or more detailed software layers on top of lower-level layers which provide underlying foundational elements, including the physical computing resources necessary to execute the software applications in question. In such cases, when a performance of the software application is unsatisfactory (e.g., too slow), it may occur that the source of the delay in execution is in one or more of the layers, and, moreover, it may be difficult to tell which layer is the source of the delay. For example, an apparent delay in communicating with a software service over a network actually may stem from an underlying delay in accessing a record from a database.

In another example(s), as referenced above and described below with respect to FIG. 3, the development model 106 may include a core development model and an extension thereof that is added for additional functionality. In such cases, the core development model may perform in a satisfactory manner, and yet the extension thereof may disrupt or disable the otherwise-satisfactory performance. This may particularly be the case where the core development model is provided by a large software vendor, while the extension is provided by a customer or third party as a customized, add-on feature, as described below.

Thus, in the system 100, one or more computing device(s) 108 may be used to provide non-intrusive annotations to the development model 106. For example, such annotations may be added without requiring a change to the development model 106 or to its associated meta-model (not shown in FIG. 1). Nonetheless, as described, the annotations may still effectively be used for their intended purpose(s) (e.g., providing performance support) with respect to the development model, as if the development model had been directly annotated.

Specifically, in FIG. 1, the computing device 108 manages a transformation chain 110 in which the development model 106 undergoes a series of transformations. Specifically, a transformation manager 112 manages at least two transformation engines 114, 116, where each transformation engine may be said to receive an input model and output a transformed model. For example, as shown, the development model 106 may serve as an input model to the transformation engine 114, which outputs a transformed model 118, which itself serves as an input model to the transformation engine 116, which, in turn, outputs a transformed model 120.

Discussion of various types and characteristics of the various transformations are provided below, and of course it may be appreciated that many more than two transformation engines may be involved in the transformation chain 110. But in general, the transformation chain serves to transform the development model, in a series of steps, into a desired form. In so doing, the transformation chain 110 also incorporates desired annotations of the development model, and makes feasible the relating of these annotations within a final, annotated, transformed model 120 back to the original development model 106. Consequently, as described, the annotations may be used for their intended purpose, without requiring modification of the development model.

For example, an annotation tool 122 may be used to annotate the development model 106 to obtain a composition model 124 that contains the annotations as well as links of the annotations to their respective elements within the development model 106. In an example where the annotations are performance-related, such as when the developer 102 wishes to know whether tasks of the development model may be processed within a certain timeframe or using a certain minimum/maximum number of resources, then historical data 126 related to these constraints/parameters/requirements in past implementations of the development model 106 may be used as part of the annotation process to obtain the composition model 124.

Thus, the composition model 124 may be used to represent annotations including the linkage information about which annotation is associated with which model element in the original Source Model. Hence, an (Annotation and) Composition Model may include two parts: One for the annotation itself and one for the linkage information. Due to the fact that the linkage information is included in the Annotation and Composition Models, it is not required to modify the original Source Model with this data General examples of operation of the annotation tool 122 are provided in detail with respect to FIG. 2. More specific examples of the operation of the annotation tool 122 in the performance realm, including example uses of the historical data 126, are provided in detail with respect to FIGS. 3, 4, 12, and 13A/13B.

In FIG. 1, transformation engines 114, 116 may also serve to annotate their respective input models, in addition to (or as part of) transforming the input model(s) into the transformed model(s). For example, the transformation engine 116 may provide an annotation functionality in association with transforming the model 118 to obtain the annotated, transformed model 120. That is, the annotated, transformed model 120 represents a model that is transformed from the development model 106 into another desired form (such as one suitable for simulation thereof, as described herein), and yet contains annotations (e.g., about performance information) that are relevant to the development model.

As may be appreciated, however, there may not be a one-to-one correspondence between elements of the annotated, transformed model 120 and the original development model 106. For example, as part of the transformation processes, some elements (e.g., nodes) of the development model 106 may be consolidated, non included, split into two or more nodes, or otherwise altered from their original form/structure. Therefore, even if the developer 102 is provided with a functional simulation or other use of the annotated, transformed model 120, such information may not be usable to the developer 102 with respect to the original development model 106.

Therefore, a trace model manager 128 may be used in association with trace model generators 115, 117 to generate trace models 130, 132. As shown in FIG. 1 and discussed in more detail below with respect to FIGS. 5 and 14, the trace model generators 115, 117 may be incorporated into the transformation engines 114, 116, respectively, e.g., may generate the trace models 130, 132 in conjunction with the generation of the transformed models 118, 120.

In use, the trace models 130, 132 serve to related source elements of an input model of a transformation engine to target elements of a transformed model of the transformation engine. That is, generally speaking, trace or tracing models 130, 132 may contain associations between models conforming to two different meta-models.

In this way, as described herein, the trace model manager 128 may permit recursive tracking of information (e.g., simulation results) related to the annotated, transformed model 120 back to the original development model 106, for convenient use thereof by the developer 102. In particular, as described in more detail herein, the trace model manager 128 may employ a model-to-model (M2M) navigation model 134 to track the trace models 130, 132 and maintain navigation information related to which models of the transformation chain are related to each of the trace models 130, 132. The M2M navigation model 134 may thus be used to associate models in the transformation chain 110 with the related trace models 130, 132. This is advantageous in the case where the various models of the transformation chain 110 are effectively non-changeable and therefore should or must not be polluted with the tracing model linkage information.

For instance, a simulation manager 136 may thus cause a simulator 138 to execute a simulation of the annotated, transformed model 120 and thereby obtain simulation results. In some implementations, the simulation results may be provided directly back to the developer 102 using a graphical user interface 140.

Figure 3:
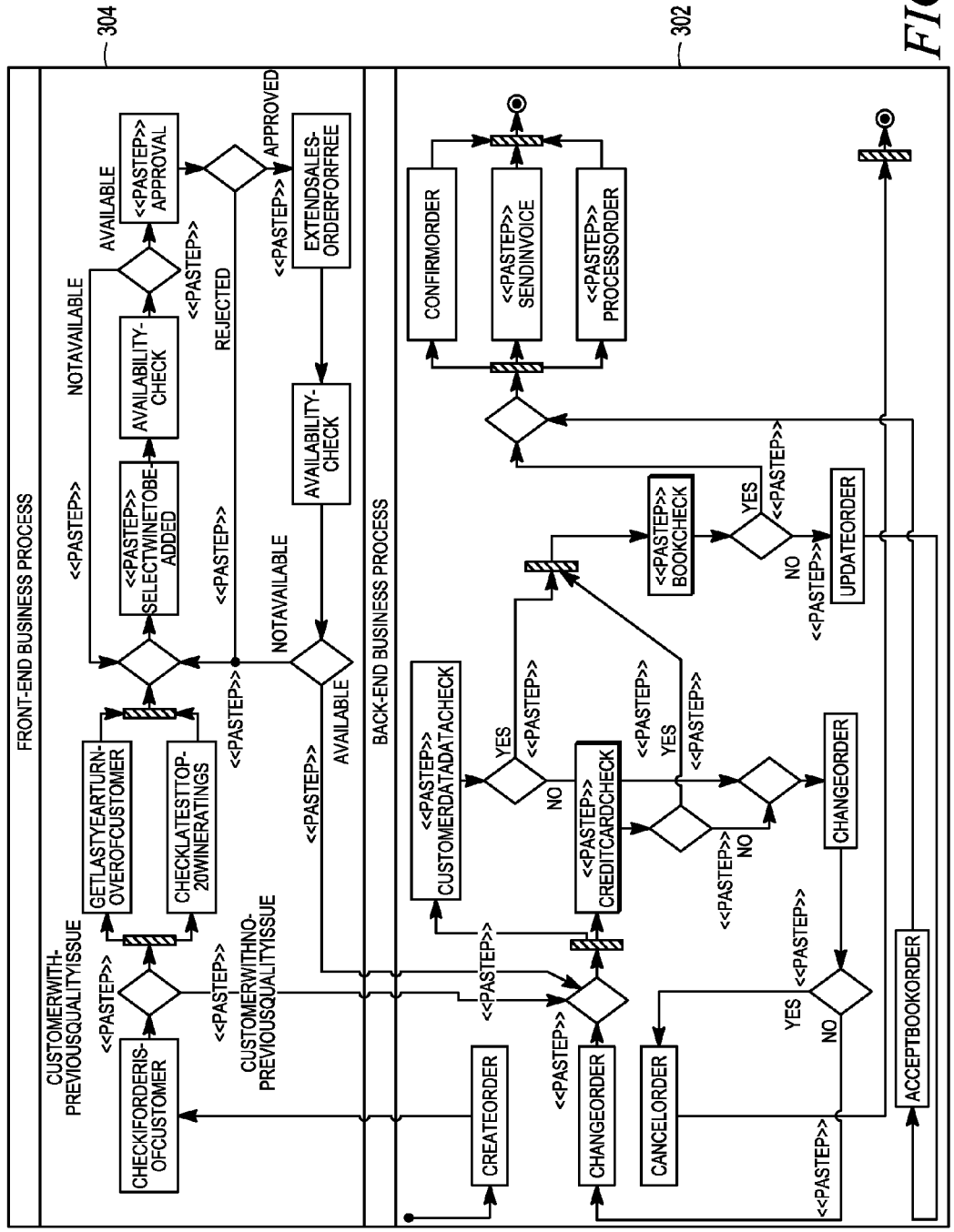
FIG. 3 is a block diagram of an example development model extended with additional functionality.

For example, the development model 106, as in the example of FIG. 3, may relate to a workflow for producing wine. The simulator 138 may provide a simulation of the annotated, transformed model 120 that illustrates a performance of this workflow, such as a time to completion. The trace model manager 128 may relate these simulation results back to the development model 106, and the GUI 140 may illustrate the development model 106 including an annotation for certain elements of the development model 106 associated with a time to completion (e.g., a half-day for each element). Then, the developer 102 may be made aware of whether the overall process will complete in time, and/or which element of the development model may be problematic in achieving this objective.

A GUI manager 142 may be responsible for facilitating operation of the GUI 140. For example, the GUI manager 142 may include a view generator 144 that provides the developer 102 with options for running certain types of simulations, such as a simulation of the development model 106. Upon instruction from the developer by way of a request handler 146, the GUI manager 142 may notify the transformation manger 112, the annotation tool 122, and the trace model manager 128 (and an assessment manager as described below) to perform their respective functions, execute the transformation chain 110 and related processes, and generate simulation results which are related back to the development model 106. Then, the view generator 144 may provide these simulation results, e.g., by providing each relevant element of the development model in association with its relevant annotation(s) (e.g., time to completion of the element).

In many cases, however, simply obtaining a simulation result in this manner may not be sufficient or preferable. For example, the developer 102 may wish to know more than a yes/no answer as to whether the development model 106 will achieve a desired performance result. For example, when the simulation result yields the information that a desired performance will not be achieved, then the developer 102 may benefit from decision support that provides the developer 102 with information about which element of the development model should be changed to obtain the desired result.

Such information may be provided by an assessment manager 148, which manages an assessment engine 150 in utilizing decision support model(s) 152 to provide such information to the developer 106. For example, the assessment engine 150 may further annotate the annotated, transformed model 120 using the decision support model(s) 152, as described below with respect to FIGS. 2 and 4. Then, the assessment engine 150 may use tracing information, e.g., from the trace model manager 128 as determined from the trace models 130, 132 and the M2M navigation model 134, to relate relevant decision support back to the development model 106.

More particularly, the GUI manager 142 may provide the developer 102 with the GUI 140 in which elements of the development model 106 are illustrated together with relevant annotations and/or decision support information. Example screenshots of the GUI 140, related to simulation results and/or decision support, are provided below with respect to FIGS. 6-11.

Thus, the system 100 of FIG. 1 assists the developer 102 in determining whether and how to improve a performance of a software process described by the development model 106. For example, the system 100 may assist the developer 102 in determining which node of the development model 106 is most likely to be associated with a performance delay, and what the source of the delay is, as well as what corrective action may be taken to correct the delay. In so doing, the system 100 may provide a reduced amount of information to the developer 102; e.g., instead of providing performance information for all possible nodes of the development model 106, the system 100 may limit the information only to those nodes which are associated with modifiable attributes, and/or may provide an optimized combination of nodes to be modified to obtain a desired result/improvement. In this way, the developer 102 is provided with performance decision support for model-driven engineering, and may independently improve a performance of a development model, with a minimum of time, effort, and cost, and without assistance (or minimal assistance) from a performance expert.

In particular, in the examples described herein such as those associated with FIG. 3 in which the development model 106 includes a core development model that is extended to include additional functionality (e.g., extended locally by the developer 102), the development model 106 as a whole may be evaluated. For example, the development model 106 may be evaluated as a whole, without altering the development model 106, to determine whether the extended model/functionality disrupts the overall operation. Then, it may be possible for the developer 102 to modify only the extended portion of the development model to obtain the desired result.

Some of the elements of the system 100 may be implemented, in whole or in part, using known and/or conventional elements, some examples of which are provided below with respect to FIG. 4. Generally, though, the transformation engines 114, 116 may be implemented, for example, using the ATLAS (ATL) transformation tool, and the simulator 138 may be implemented using the AnyLogic simulation tool.

Although the above examples have been given primarily in terms of performance analysis and support, it will be appreciated that the system of FIG. 1 may be used for other purposes, as well, with similar advantages in terms of annotating the development model 106 for other purposes, without requiring modifications to the development model or meta-model to do so, as described herein. For example, examples of such contexts and purposes may include scenarios in the security realm, such as where additional security processes are to be tested for strength, compatibility, or other purposes. In other examples, annotations may be used to visualize layout information for the development model. It should be appreciated, then, that the term simulation should not be limited to performance simulations, and may refer to the above or other example simulations or representations of a result of an operation of the development model 106.

In this regard, it will be appreciated that there may be multiple elements of FIG. 1 that may perform such evaluations. That is, it may be appreciated that any type of computation(s) or evaluation(s) such as those just referenced may be performed based on the development model 106, the composition model 124 (with the appropriate annotations), and with the transformation chain 110 itself, which incorporates the models 106, 124 as part of a potentially long transformation chain in which trace models 130, 132 are used to relate the results back to the original development model 106. The use of such a generic evaluation engine is represented in FIG. 1, where the assessment engine 150 is illustrated as an example evaluation engine. However, the transformation engine 116 which receives the models 106, 124 also may server as an example of such an evaluation engine, as may other types of elements such as in the security or layout examples above.

Thus, generally speaking, an annotation engine such as the annotation tool 122 may be configured to input the development model 106 of a software application and associate annotations with elements of the development model, and may be configured to provide links between each annotation and its associated element to thereby output a composition model 124. Then, the transformation manager 112 may be configured to coordinate transformation engines 114, 116 within a transformation chain 110 or portion thereof, each transformation engine configured to transform the development model, or subsequent transformations thereof, into a transformed model. An evaluation engine may be configured to receive the composition model (directly or indirectly) and an output model of the transformation chain, and may be configured to determine a relation of the output model to the development model for evaluation of the development model therewith.

Although FIG. 1 is illustrated in an abstract and simplified form, it will be appreciated that the system 100 supports a high quantity of large, varied, and complex development models. For example, the transformation chain 110 may be composed of a large number of transformations that may be needed or desired to obtain a desired result for simulation. Nonetheless, because of the discrete nature of the transformation engines 114, 116, the developer 102 may select and configure only those transformation engines that are needed for a particular transformation chain. Thus, the system 100 presents a modular approach that may be adapted to a specific situation.

Further, in the example of FIG. 1, several examples are given in which models (e.g., the development model 106, the transformed/input model 118, and the annotated, transformed model 120 are annotated with performance or other types of annotations, as described. In more detail, in this context, the term annotation (also possibly referred to as a profile, profile model, profile meta-model or using other known nomenclature in the art) refers generally to a technique for extending a functionality or use of an underlying model, as described in more detail below, e.g., with respect to FIG. 2. For example, as already described, it is generally known that models at a given layer of abstraction may be annotated in order to provide a desired use, feature, or functionality for an associated software application, such as when an otherwise generic model/application is to be implemented in a more specific context or domain. Such annotations may themselves be formalized, so that designers or other users may add desired features or functionalities to models in a straight-forward, consistent manner.

For example, models expressed in the Unified Modeling Language (UML) may be associated with a number of such profiles, e.g., meta-models providing extensions to the language they effectively extend (e.g., UML). The extensions can provide domain specific information, such as, for example, when a UML model may include an element (node) that is associated with a particular software component (e.g., a software component associated with processing a credit card transaction). Then, for example, a designer may wish to associate a security profile to the element, in order to provide a desired level of security for the credit card transaction. Since the security profile itself may be pre-defined and substantially uniform, the designer or other user may also apply the same security profile to other elements of the example UML model, or to (elements of) other UML models entirely.

Analogously, as already referenced in the performance realm, performance annotations may exist which characterize a performance or execution of the software process characterized by a development model. For example, such performance annotations may characterize a probability of execution of a branch of a development model, or a resource usage of a node of the development model, or an average time of execution of a node of the development model, or other performance-related information. Examples of such performance profiles include the Scheduling, Performance, and Timing (SPT) profile, the Modeling and Analysis of Real-Time and Embedded Systems (MARTE) profile and its Performance Analysis Model, among others. Specialized performance annotations also may be constructed by the developer 102 or others for use in the system 100.

For example, the developer 102 may wish to apply a modification constraint such as a min/max number of employees that may be assigned to a department associated with a node or type of node, as described above. However, the department and node (type) may occur multiple times within a single development model and/or profile meta-model, and also may occur one or more times within a group or collection of such models/profiles. Moreover, although the developer 102 may wish to specify a particular employee range at a point in time, it may later occur that a different range may be desired (e.g., if a new employee is hired, or a current employee leaves or is reassigned). Therefore, it may be problematic to specify and thereafter update the accurate/desired range everywhere that the associated node/department appears within the model(s) in question.

Due to the factors just referenced (e.g., large number of model nodes/elements, large number of profile elements/annotations, and/or potentially frequent changes/updates of the models or profiles), it may be advantageous to be able to use flexible, automated annotation engine(s) referenced herein to implement the system 100. For example, FIG. 2 is a block diagram of a system 200 for providing non-intrusive model annotation for model-driven engineering.

Figure 2:
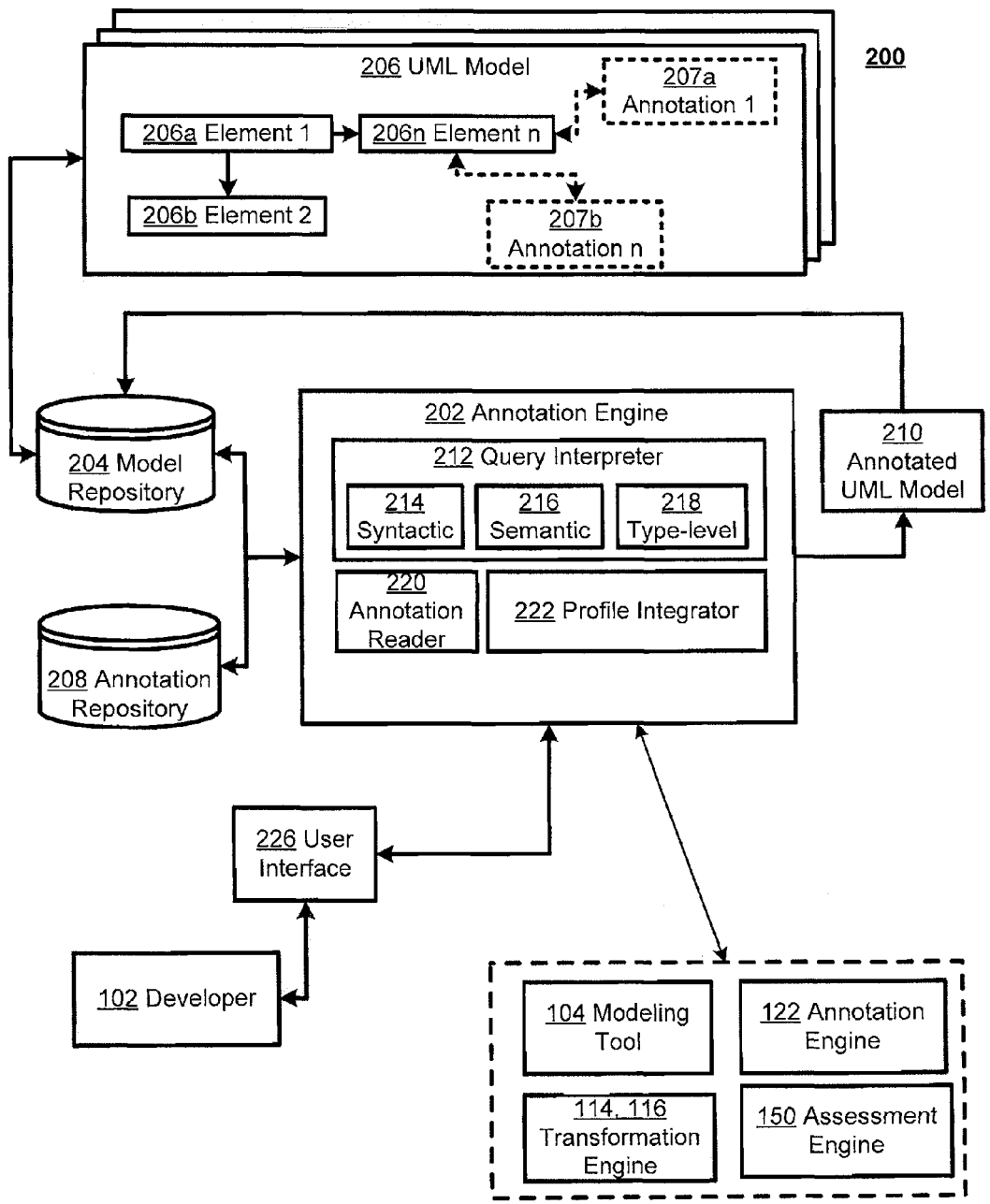
FIG. 2 is a block diagram of a system for providing non-intrusive model annotation for model-driven engineering

Thus, FIG. 2 illustrates an annotation engine 202 that may be used to perform various aspects of the system 100 of FIG. 1. More specifically, the annotation engine 202, as shown, may be used in conjunction with, or as part of, one or more of the modeling tool 104, the transformation engines 114, 116, the annotation tool 122, and the assessment engine 150. That is, the discussion of FIG. 2 is primarily provided in the context of a generic version of the annotation engine 202, which may be used in whole or in part by any of the elements 104, 114, 116, 122, and 150 to execute the functionality described above, and which is therefore described essentially independent of any one of these tools for the purposes of FIG. 2.

Thus, in the example of FIG. 2, the annotation engine 202 may be configured to query a model repository 204 to obtain desired elements and/or desired models (e.g., a model 206, shown in FIG. 2 as a UML model). The annotation engine 202 also may access an annotation repository 208 containing a number of possible annotations (e.g., as profiles) to be provided to the UML model 206 (e.g., to elements thereof). Then, the annotation engine 202 may extend or modify the obtained models/elements using the accessed profiles, to thereby obtain an annotated model 210. The annotated model 210 may then be used to implement an associated software application (not illustrated in FIG. 2, but considered to be, for example, any of the various software applications, workflow processes, or other software processes described herein), and/or may be returned to the model repository 104 for further annotation thereof, as desired. It will be appreciated that the annotation repository 208 may thus represent, for example, a repository storing the composition model 124 and/or the decision support model 152, as well as any of the annotation models described below with respect to FIG. 4.

Thus, the annotation engine 202 allows for convenient and flexible access to the model repository 204 and to the annotation repository 208, even when the repositories 204, 208 contain large numbers of models and annotations (e.g., profiles), respectively. Consequently, for example, designers or other users may easily obtain only those models/elements that are desired for annotation thereof. Further, the resulting annotation(s) may proceed in an automatic, intuitive fashion. As a result, designers or other users may provide the annotated model 210 as a more domain-specific version of the original, more abstracted model 206, and, if necessary, may also later modify the annotated model 210 (e.g., change the annotation or add a new annotation/profile) in a straight-forward fashion.

As may be appreciated from the above description, then, the model repository 204 may contain hundreds or thousands of models, where each model may contain tens, hundreds, or thousands of elements or other nodes. In the simplified example of FIG. 2, the single UML model 206 is illustrated as including element 1 206a, element 2 206b, and element n 206n. That is, as may be understood from basic principles of UML, the UML model 206 may include these elements 206a, 206b, 206n as being graphically represented and arranged to illustrate a functionality, operation, or other characteristic of an associated software application or other process. More detailed and specific examples of UML model 206 and associated elements are provided herein.

Meanwhile, as described, one or more annotation meta-models or annotations provided for UML may exist in the annotation repository 208. As a result of the operations of the annotation engine 202, as described herein, an annotation 207a and 207b may be applied to the UML model 206 as being annotated to the element 206n. Although the UML model 206 illustrates the annotations 207a, 207b in dashed line to illustrate their optional addition to the UML model 206 based on actions of the annotation engine 202, it may be appreciated that the inclusion of the annotations 207a, 207b allow the UML model 206 to serve as an example of the annotated UML model 210, as well (which, as described, may be returned to the model repository 204 for use and/or for further annotation thereof).

Many other examples of models, elements, and associated annotation or profiling thereof are described herein. In general, the concepts related to the extension of models/elements through the use of an associated extension or profile meta-model may be known or characterized by a plurality of terms and terminologies. For example, although the annotation of the UML model 206 is described herein as such, it may be appreciated that such model annotations also may be referred to as refining, branding, stereotyping, integrating, composing, or specifying the models/elements, or may be referred to as adding metadata to the models/elements. Such terminology may be overlapping or interchangeable, or may be dependent on the type of modeling language, model, or element being profiled/extended/annotated. Further, although the elements 206a, 206b, 206n are referred to as being associated with a software component, it may be appreciated that UML includes other (or more specific) types of elements, e.g., interface elements, activity elements, class elements, operation elements, or state machine elements.

Thus, in general, in the context of UML models used in the present examples, the concept of profiling the models/elements is known, and is not described further herein, except to provide illustrations and examples of operations of the annotation engine 202 in various contexts of the system 100 of FIG. 1. However, although concepts of profiling/annotation are known to some extent in UML, Java, or other contexts, these known concepts, by themselves, may suffer reduced or eliminated utility relative to the example system 200 of FIG. 2. For example, as already referenced, the model repository 204 may contain hundreds or thousands of models, so that, without the annotation engine 202, a designer or other user may need to sort through the many models in order just to find the desired models/elements, and then proceed to add a desired annotation(s) to each element. If a designer fails to determine all desired models/nodes, or determines incorrect ones of the desired models/nodes, then the resulting annotation will be incorrect and/or incomplete. Moreover, even if the desired annotation is completed accurately, the time required to do so may be impractical. Still further, even if the desired annotations are completely and correctly added, it may later occur that the annotation(s) themselves must be amended or corrected, whereupon the designer may have to re-implement the process of locating desired models/elements for (re) annotation thereof. In contrast, the annotation engine 202 allows for flexible, automated profiling that may be completed quickly and accurately by non-profiling experts, and may be repeated as circumstances warrant.

In particular, the annotation engine 202 allows querying of the model repository 204 in a manner that returns, as a result set, desired models/elements that the designer or other user wishes to annotate. For example, the annotation engine 202 may include a query interpreter 212 that executes queries against the (e.g., performance-related, development model or performance analysis model) model repository 204. These queries may include, for example, syntactic queries 214, semantic queries 216, or type-level queries 218.

The annotation engine 202 further includes an annotation reader 220 that may be configured to obtain a desired annotation meta-model from the annotation repository 208, and an annotation integrator 222 that may be configured to receive the annotation meta-model from the annotation repository 208 for the creation and integration of instances thereof with the result set of models/elements provided by the query interpreter 212. Then, as described herein, the annotation integrator 222 may be configured to output the annotated UML model 210 (e.g., back to the model repository stations and/or for use in an associated software application or other process).

In some implementations, the annotation engine 202 may be configured to compile, interpret, or otherwise process a domain-specific language (DSL) to obtain the properties and functionalities described herein, such as the Query and Annotation Language (QUAL). For example, one or more such DSL(s) may provide for the querying of the model repository 204 by the query interpreter 212, the reading of the annotation repository 208 by the annotation reader 220, and/or the annotation of the retrieved model/elements with instances of the retrieved profile(s) by the profile integrator 122.

A user interface 226 may represent a graphical user interface (GUI) used by a designer or other user to utilize the annotation engine 202, and/or may include a browser, a text editor, or any known technique to, for example, enter query parameters or otherwise specify models or profiles. The user interface 226, such as the GUI 140 of FIG. 1, may be provided to or accessed by the developer 102 or other users.

Although FIG. 2 illustrates a number of example implementations of the annotation engine 202, it will may appreciated that these examples are illustrative, and non-limiting. Additional or alternative examples are provided herein, and still further implementations, not explicitly discussed, also would be apparent to those of skill in the art.

FIG. 3 is a block diagram of an example development model 300 extended with additional functionality. In particular, The development model 300 may include a back-end or core component 302 and a front-end or extended component 304. FIG. 3 is included merely for the sake of context and example, and so elements of the models 302, 304 are not discussed in individual detail.

Instead, it may be appreciated in general that the development model 300 is an example in which a wine seller obtains wine supply from several suppliers, and thereafter sells the wine to different customers. In the example, the Sales and Distribution Organization of the Wine Seller is supported by a standard software product implementing standard back-end processes. The back-end process under consideration is organized in functional units providing its own business behavior, which may be referred to as Process Components. Thus, a concrete business application uses functionality provided by multiple Process Components.

In the example of FIG. 3, a manager of the Sales and Distribution Organization of the Wine Seller may wish to extend the existing business process so that it is supported to add an extra free bottle of wine to orders of those customers who noticed a quality issue for their previous order. In the example, the decision as to which wine will be added for free is taken manually by a wine specialist based on the wine rating and the customer's purchase history over the last 12 months. Additionally, the selection has to be approved by the manager of the Sales and Distribution Organization.

This raises the need for an extended version of one Process Component, which is Sales Order Processing and which is represented in FIG. 3 as development model 302. It is, however, not desirable to change the business process (302) directly in the back-end because the application should be independent of the software vendor life cycle. Therefore, the present description, e.g., the system 100 of FIGS. 1 and 4, may be used to provide a platform-independent technology that may use the platform back-end business logic without modifying it directly.

The business process which is required to extend the back-end process is defined as a new front-end business process, shown in FIG. 3 as development model 304, by a domain expert, i.e., an employee of the wine seller who is knowledgeable regarding the business processes and needs of the wine seller (as opposed, e.g., to a general software developer and/or performance expert). For example, the developer 102 of FIG. 1 may use the modeling tool 104, which may include functionality such as Galaxy software available from SAP AG, that may be used to model front-end business processes by using Business Process Modeling Notation (BPMN) as a domain specific language (DSL).

Thus, it may be seen from the example of FIG. 3 that models and model-driven engineering (MDE) concepts for the development of user inter-faces, front-end business processes and proprietary models of back-end processes are conventionally available. The Composite Applications (i.e., the overall development model 300 of FIG. 3) can be developed by applying MDE concepts and by involving domain experts in the software development process.

Additionally, these concepts enable a high degree of flexibility, by enabling the extending of a back-end process, independent of the software vendor lifecycle. As also demonstrated by the example, several steps within such business applications may need to be processed by human resources. The decision about which and how many human resource performs which step in a business process is not trivial to make. This difficulty is further increased by the flexibility introduced by allowing the domain expert, with no performance-related expertise, to extend the back end process (e.g., 302) with front end processes (e.g., 304). Such extensions may dramatically change the behavior of already running and stable systems. Such a domain expert may not be able to decide while introducing the extensions or customizations if they may lead to any performance related consequences. In the context of the example of FIG. 3, for example, the performance related issue(s) may include be unacceptably increased processing time (as a performance objective of the overall process 300), due, e.g., to the introduction of the two additional manual steps as referenced above.

Figure 4:
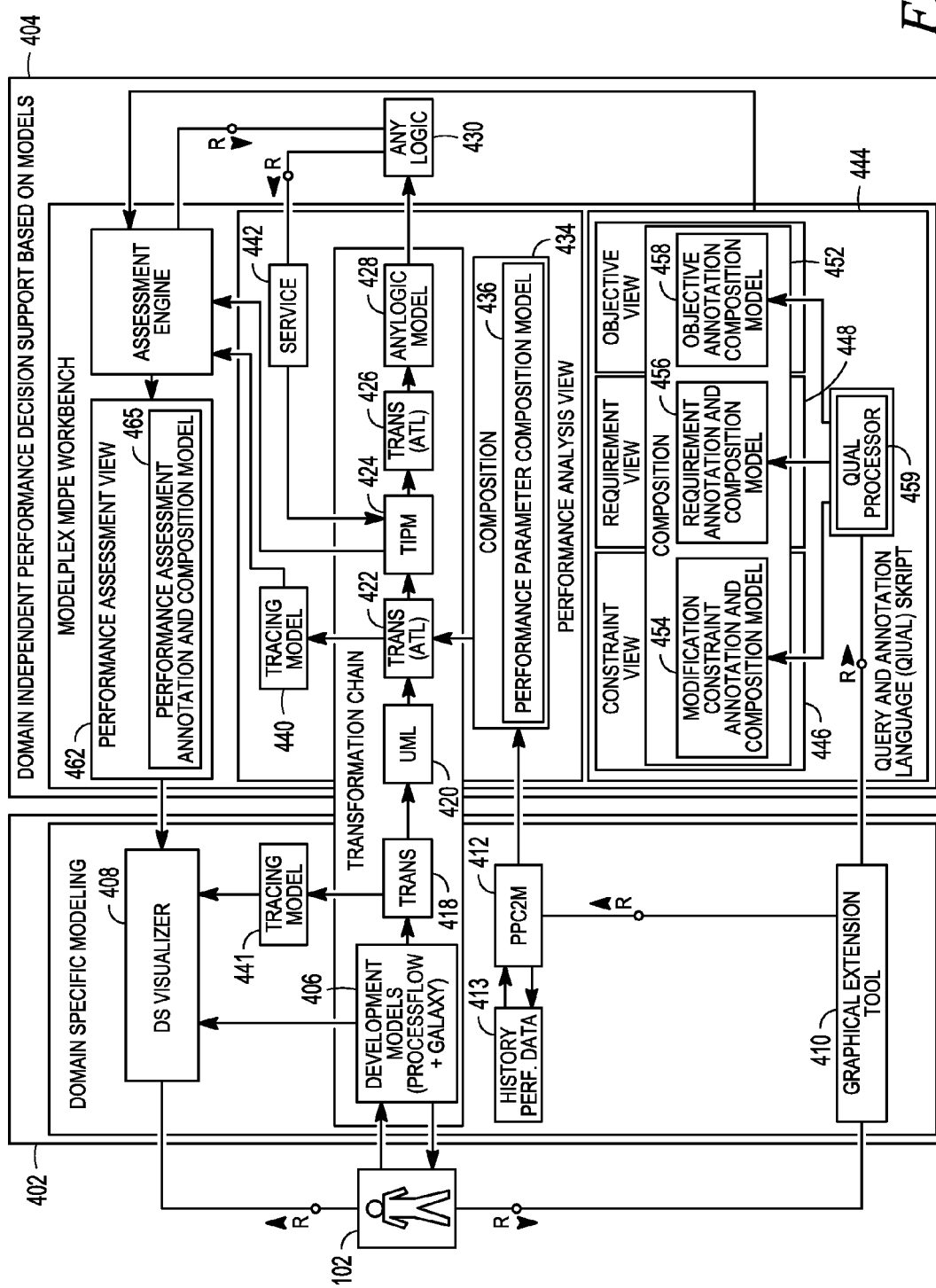
FIG. 4 is a block diagram of an implementation of the system of FIG. 1, used for performance-driven engineering.

FIG. 4 is a block diagram of an implementation of the system of FIG. 1, used for performance-driven engineering. The example of FIG. 4 is provided below with respect to the scenario described with respect to FIG. 3, above, for the sake of illustration. In general, as already referenced, model-driven performance engineering (MDPE) may be defined as an extension of MDE enabling performance engineering based on development models and additional performance related data, e.g., annotations related to resource demands of steps, branch probabilities and factors due to contention for resources. Multiple tools are supported that enable multiple performance prediction techniques. For example, as referenced herein, the system(s) of FIGS. 1 and/or 4 may use AnyLogic Simulation Models as input for performance prediction tools.

Hence, MDPE utilizes MDE concepts. In order to support multiple kinds of development models and multiple performance prediction techniques and reduce the number of required transformations, MDPE may use, as referenced above, Tool Independent Performance Models (TIPMs). Such use of TIPMs enables handling not only of proprietary modeling languages but also with well known modeling languages, such as UML. Additionally, tool independence may be of high value for business software vendors, in order to not be dependent on one specific simulation tool when simulating performance results. An example of the TIPM meta-model has been defined as a refined and slightly extended version of the Core Scenario Model (CSM). The TIPM focuses on behavior information, available resources, and consumption of resources. It can be refined by annotating stepwise performance related information, such as, for example, resource demands, branch probabilities, and/or factors due to contention for resources).

In the example of FIG. 4, then, the developer 102 has access both to domain-specific modeling tools 402 and to domain-independent MDPE tools 404. In the former, the developer may access development models 406 (such as the development model 300 of FIG. 3, which may include back-end process flow(s) 302 and front-end (e.g., Galaxy) process flow(s) 304. The developer may be provided with domain-specific visualization tool(s) 408, which may include or be associated with the GUI 140 of FIG. 1. Similarly, the developer 102 may have access to a graphical extension tool 410 that serves as an interface between the domain-specific realm 402 and the MDPE realm 404, as described in more detail, below.

Finally in the domain-specific realm 402, a process performance control (PPC) tool 412 is illustrated, which represents an extraction tool that obtains/provides performance data from a database 413. For example, in the scenario of FIG. 3, the back-end process 302 may already have been running for a period of time. The PPC 412 may be used to get the average resource demands in employee time for each manually processed action in the back-end business process 302. Similarly, the PPC 412 may be used to calculate the probabilities of paths in the back-end development model 302, and to determine resource mapping(s), such as, for example, how many employees are working on which manual step in the model 302.

In contrast, for newly defined front-end processes, such as the front-end development model 304, assumed values may be annotated in order to specify resource demands, probabilities of paths, resource mappings, and/or other performance parameters. For example, a performance analysis view 414 may be generated using a transformation chain 416, as referenced above, and, as also referenced, existing MDPE elements may be used, such as the Performance Analysis Modeling (PAM) package of the model-driven development of Real Time and Embedded Systems (MARTE) profile. MARTE is a profile specified for performance annotations by the Object Management Group (OMG).

In the transformation chain 416, as a specific and more detailed example of the transformation chain 110 of FIG. 1, a first transformation engine 418 may use the ATLAS Transformation Language (ATL) to transform the development model 106/300 into a UML model 420, which may thus be seen as a transformed model of the transformation engine 418 and an input model of the next transformation engine 422, also using the ATL. Specifically, in order to automatically transform the UML model 420 to a TIPM 424, the ATL may be used to perform a transformation between the relevant UML meta-model and the relevant TIPM meta-model.

Then, a transformation engine 426 may be used to transform the TIPM into a tool-specific performance model (TSPM) such as an AnyLogic model 428 referenced above that is suitable for the Simulation Tool AnyLogic from XJTech, which may be used to provide a simulation model as simulation results. From such a simulation based on the UML representation of the business process, it is possible to predict, for example, the throughput time for a Sales Order, or the utilization for each department for the Wine Seller.

In more detail, the transformation engine 422, in transforming the UML model 420 into the TIPM 424, may access a composition model 436 referenced as a performance parameter composition model 436 within a composition environment 434. As may be appreciated from the above, and as described in more detail below with respect to FIGS. 12 and 13A/13B, the annotation tool 122 may use the PAM package of the MARTE profile, together with the historical data from the PPC for the back-end model 302 and assumed performance parameters/values for the front-end model 304, to create the model 436. In FIG. 4, this process may occur with the development models 406 through the graphical extension tool 410, so that, as already described, the model 436 may include the performance annotations as well as links from the annotations to their corresponding elements within the development model(s).

The transformation engines 422, 426 may use corresponding transformation models (not illustrated) to execute their respective transformations. In particular, the transformation engine 422 may implement the techniques of FIG. 2 to annotate the UML model with the performance parameters. In addition, the transformation engine 422 may simultaneously generate the tracing model 440, while the transformation engine 418 generates a tracing model 441, as described in more detail below with respect to FIG. 14. Although not shown specifically in FIG. 4 for the sake of simplicity, it will be appreciated from the description of FIG. 1 that each of the transformation engines 418, 422, 426 may be associated with a trace or tracing model, and that the trace model manager 128 of FIG. 1 may use a M2M navigation model (such as model 134) to navigate from elements of models at the end of the transformation chain 416 to elements at the beginning, as described herein. Finally in the performance analysis view 414, a service 442 may be used to relate simulation results of the simulation tool 430 back to the TIPM 424, in order to fill the TIPM with simulation results from any potentially non-model driven simulation tool.

Further in FIG. 4, decision support models/views 444 are illustrated which generally represent user-defined or specified (e.g., via the graphical extension tool 410) models/views which provide a constraint view 446 (e.g., time constraints), a requirement view 448 (e.g., resource requirements), and an objective view 450 (e.g., goals). Thus, within a composition 452, a modification constraint annotation and composition model 454 may be defined, along with a requirement annotation and composition model 456, and an objective annotation and composition model 458. More specifically, these models may be generated using the Query and Annotation Language engine such as the annotation engine 202 of FIG. 2.

Thus, it may be appreciated that the views/models 444 of FIG. 4 may represent examples of the decision support models 152 of FIG. 1. Specifically, such information may be used so that it is possible not only to predict business performance of composite applications, but also to give indication for designers of composite applications of what in a design or resource mapping has to be changed in order to meet objectives, requirements and modification constraints.

For example, as shown in FIG. 1, an assessment engine 460 may input the simulation results from the simulation tool 430, the models/views 444, and tracing information from the tracing model 440 (and other tracing models not shown) and the transformation chain 414, and output a performance assessment view 462 for providing decision support in performance related modeling decisions of the developer 102. Specifically, as referenced with respect to FIG. 1, the performance assessment view 462 may include a performance assessment annotation and composition model 465, in which simulation results are not only related to the original development model(s) 406, but in which additional information is provided to assist the developer 102 in modifying, e.g., the front-end process 304 to obtain a desired performance result.

The user-specified, decision support models/views 444 may be associated with, or part of, the modeling tool 104 (e.g., a plug-in to the EMF) of FIG. 1, and the Graphical Extension Tool 410 may allow the developer 102 to specify performance parameters associated with a potential improved execution of the relevant software processes, including potential alterations to the associated development model 406.

For example, in the example of FIG. 3, the development model 300 is associated with a software process including a workflow performed in part by human workers in a department of the wine seller, and the developer 102 (or other authorized user) may specify a minimum and maximum number of employees that may be assigned to that department and/or to a specific task, such as described above. Later, in optimizing the development model for performance, e.g., for performing the workflow within a specified maximum amount of time, the developer 102 may decide to allocate an appropriate number of employees to the relevant department, up to the maximum, in an attempt to obtain the desired result. Further, in the implementations just referenced in which decision support is provided, the system 400 of FIG. 4 may proactively suggest a number of employees to assign, within the specified range. For example, some number of employees lower than the maximum number may be suggested, and re-assignment of the remaining employees may occur to a separate department that may be associated with a delay in the development model and that may therefore provide a larger net benefit in reducing the overall execution time.

To provide the type of performance decision support just described, the performance assessment model view 462 may be used. It may be appreciated from the above discussion that the performance assessment view 462 thus provides a model which may be simulated using the visualization tool 408, but with specific simulations that are limited or otherwise customized to the performance parameters associated with the user-specified, decision support models, and that are therefore more intuitive and manageable for the developer 102. Further, as described in more detail below, such simulations may include specific visualizations of possible performance metrics and/or performance optimizations (e.g., different combinations of potential alterations to the development model, each of which may offer a different level or type of improved execution), to thereby assist the developer 102 in selecting a preferred performance optimization.

In the example of FIG. 4, the performance objective view 450 may be used to generate performance objective annotations. Such performance objective annotations may include potential annotations to the performance analysis model that are related, e.g., to performance requirements of the development model (e.g., a requirement that an entire associated software process completes in a maximum amount of time, or a requirement that a maximum amount of computations resources be assigned to a particular node/task), or to performance improvements (e.g., changes that are within the specified range of performance requirements, and that then provide some other performance objective, such as an increased resource utilization associated with improving profitability).

As another example, the modification constraint view 446 may be used to generate modification constraint annotations which may provide, for example, configuration options having a specified range or type. In the former example, the range may be a range of employees, as above, or of some other parameters, while in the latter example, the type may be, e.g., specified as fixed or variable.

Thus, in operation, and as described, assessment engine 460 may be configured to input the simulation results from the simulation tool 430, and one or more user-specified performance profiles (e.g., modification constraint annotations and/ or performance objective annotations), for combination thereof into the performance assessment model.

Figure 5:
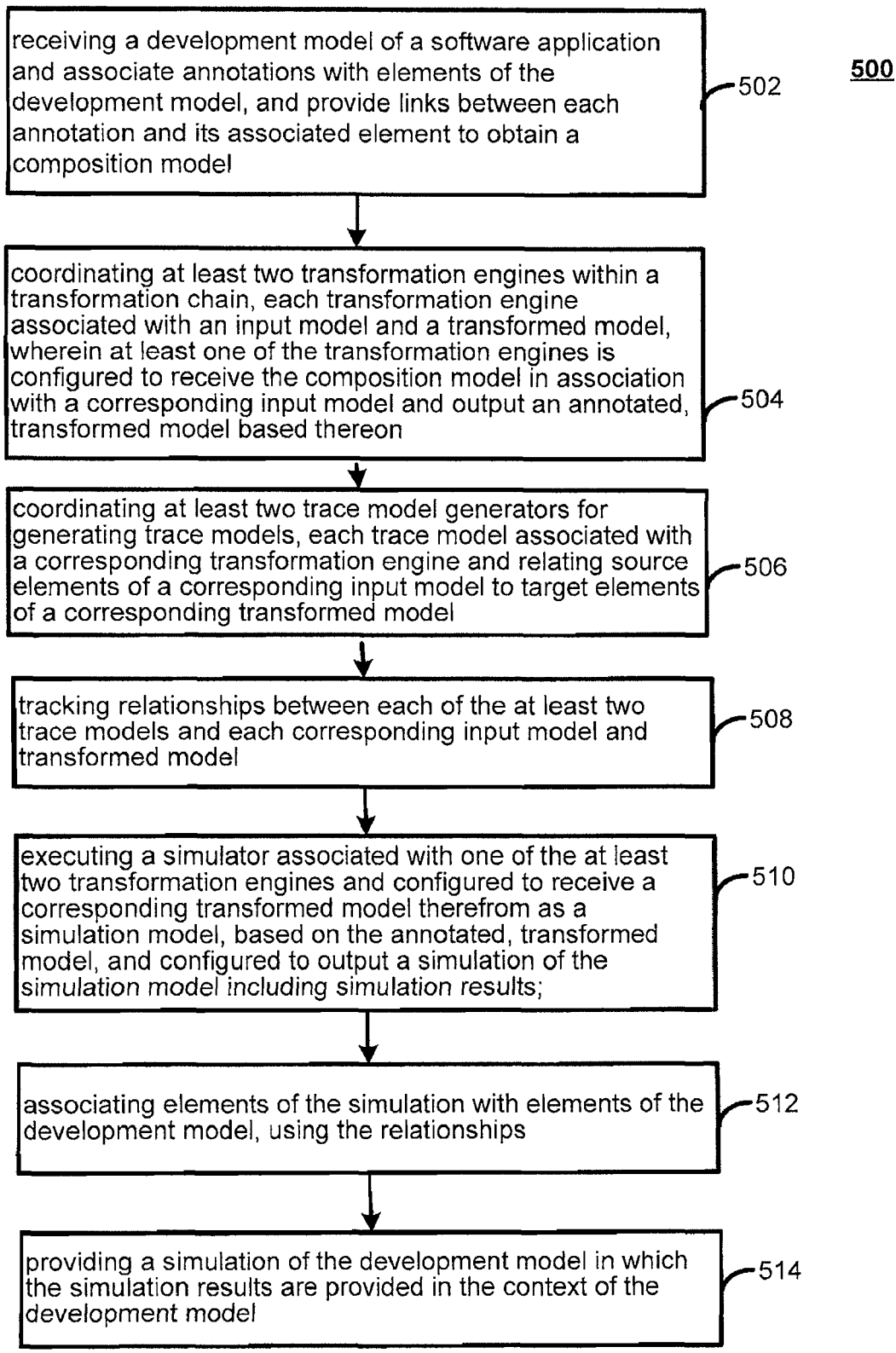
FIG. 5 is a flowchart illustrating example operations of the system(s) of FIGS. 1 and/or 4.

FIG. 5 is a flowchart 500 illustrating example operations of the system(s) of FIGS. 1 and/or 4. In the example of FIG. 5, a development model of a software application may be received, and annotations may be associated with elements of the development model, with links being provided between each annotation and its associated element, to thereby obtain a composition model (502). For example, the transformation manager 112 of FIG. 1 may coordinate reception of the development model 106 at the transformation engine 114, or the reception of the development model(s) 406 (such as the model 300 of FIG. 3).

At least two transformation engines may be coordinated within a transformation chain, each transformation engine associated with an input model and a transformed model, where at least one of the transformation engines may be configured to receive the composition model in association with a corresponding input model and output an annotated, transformed model based thereon (504). For example, in FIG. 1, the transformation manager 112 may coordinate the transformation engines 114 and 116 to facilitate transformation therewith of the development model 106 into the transformed model 114, which is the input model of the transformation engine 116 that receives the composition model 124 and outputs the annotated, transformed model 120. FIG. 4 illustrates a similar transformation chain 416, and from which it may be appreciated that more than two, and in fact virtually any desired number of, transformation engines may be coordinated to eventually obtain the annotated, transformed model 120, e.g., the AnyLogic simulation model 428 of FIG. 4.

At least two trace model generators for generating trace models may be coordinated, each trace model associated with a corresponding transformation engine and relating source elements of a corresponding input model to target elements of a corresponding transformed model (506). For example, the trace model manager 128 may be configured to coordinate trace model generators 115, 117 within the transformation engines 114, 116. That is, as described above, the trace model generators 115, 117 may be contained within or associated with the transformation engines 114, 116. For example, as described in more detail below with respect to FIG. 14, the trace models 130, 132 may be generated as a corollary action of the transformation functions of the transformation engines 114, 116 themselves. In other implementations, the trace model generators 115, 117 may be implemented separately from the transformation engines 114, 116. Similar comments apply to the transformation engines 418, 422, 426 of FIG. 4, although not all trace models and trace model generators are explicitly illustrated therein.

Relationships may be tracked between each of the at least two trace models and each corresponding input model and transformed model (508). For example, the trace model manager 128 may use the M2M navigation model 134 to track relationships between the trace model 130 and the input/ transformed models 106/118, and to track relationships between the trace model 132 and the input/transformed models 118/120. Although the M2M navigation model is not specifically illustrated in FIG. 4, it may be appreciated that the same technique may be used there, e.g., to track relationships between the trace model 440 and the UML model 420/TIPM model 424.

A simulator may be executed that is associated with one of the at least two transformation engines, where the simulator may be configured to receive a corresponding transformed model therefrom as a simulation model, based on the annotated, transformed model, and configured to output a simulation of the simulation model including simulation results (510). For example, in FIG. 1, the annotated, transformed model 120 itself acts as such a simulation model, although it may be appreciated from FIG. 4 that the example of FIG. 1 is simplified, and in fact there may be more transformation(s) after the annotated, transformed model to obtain the simulation model, for use by the simulation manager 136 in executing the simulation with the simulator 138 (e.g., the AnyLogic simulator 430 of FIG. 4). For example, in FIG. 4, the TIPM 424 is an example of the annotated transformed model, and then another transformation occurs to obtain the AnyLogic model 428 as the simulation model. In other examples, the TIPM model 424 or other type of model at a similar position in the transformation chain may serve itself as the simulation model, depending on the type of model and/or the type of simulation tool.

Elements of the simulation may be associated with elements of the development model, using the relationships (512). For example, considering FIGS. 1 and 4, the trace model manager 128 may be used as described above, e.g., with the M2M navigation model 134 and the trace models 130, 132 to relate the simulation elements (e.g., of the simulation resulting from the AnyLogic simulator) with corresponding elements of the development model 406. More specific examples are provided below, e.g., with respect to FIG. 15.

A simulation of the development model may be provided in which the simulation results are provided in the context of the development model (514). For example, in FIG. 1, the GUI 140 may be used to present the simulation results in the context of the development model 106. In FIG. 4, the simulation results may be provided using the visualization tool 408. Specific examples of screenshots of such simulation results in the context of the related development models are provided below with respect to FIGS. 6-11.

As referenced above, some implementations may include simple simulations in which, for example, a performance of the development model(s) is tested and results are determined, such as whether the process will complete in the desired amount of time and with the available amount of resources. In other examples, decision support may additionally be provided, in which, when the simulation determines that the relevant performance parameters will not be met, the developer 102 may be provided with options and information as to whether and how to alter the development model so as to obtain the desired performance results (e.g., to allocated more resources to a particular task/node of the development model). As described, the assessment manager 148 may be responsible for executing the assessment engine 150 to use the decision support models 152 (e.g., the various assessment views/models 444 of FIG. 4) to provide such decision support. Specific examples of such performance assessment for decision support are provided below with respect to FIGS. 13A and 13B.

Figure 6:
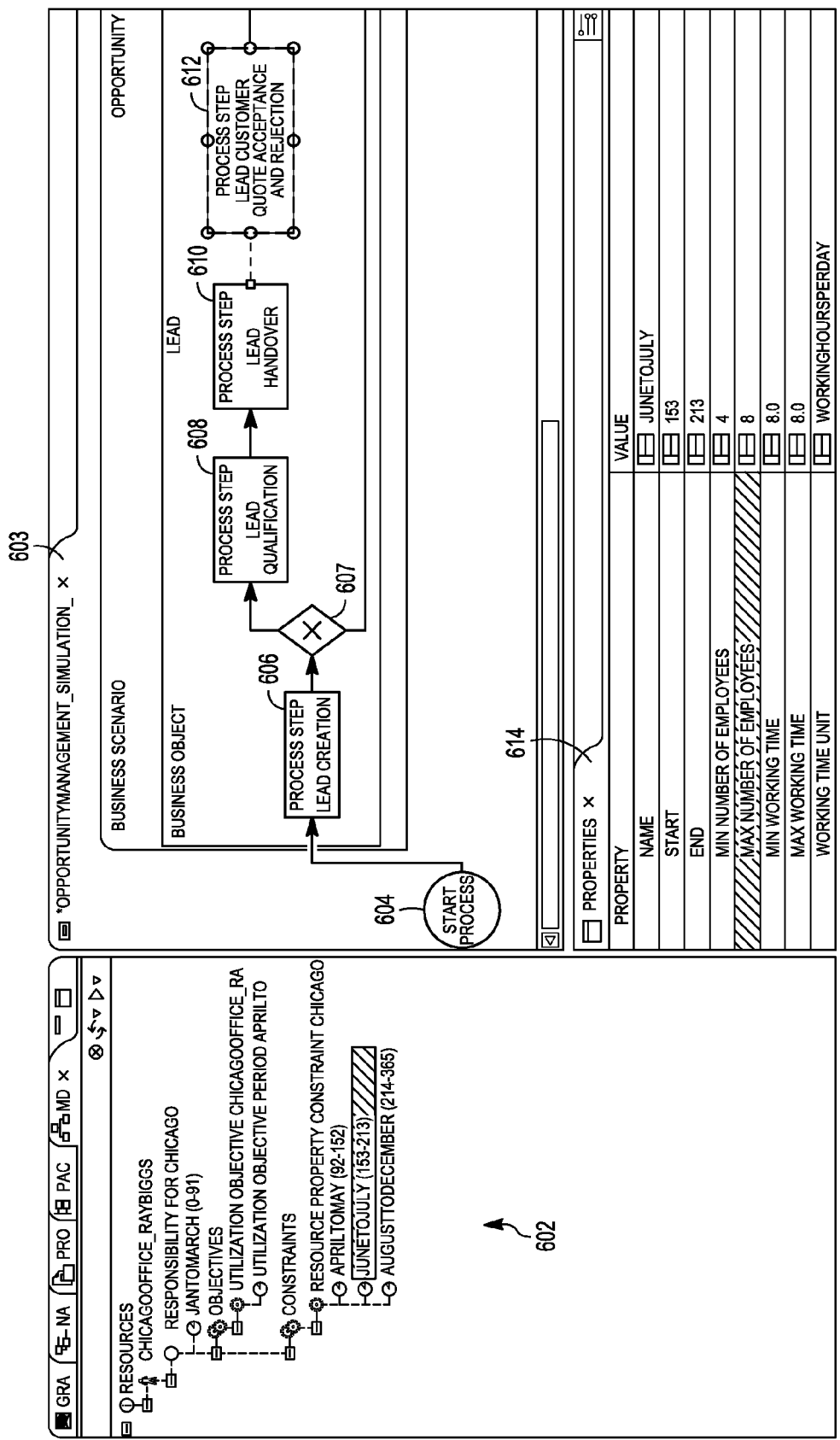
FIG. 6 is a first screenshot illustrating a first example implementation of the system of FIG. 1.

FIG. 6 is a first screenshot illustrating a first example implementation of the system of FIG. 1. In FIG. 6, a resources tab 602 illustrates resources associated with a simulation of a development model associated with an opportunity management. For example, a salesperson at an organization may be considered a resource of the organization, while an opportunity might represent a sales opportunity, represented by a person, a company, or a department of a company, for example. Such a development model may be associated, for example, with a Customer Resource Management (CRM) application.

In the resources tab 602, it may be seen that a resource (salesperson Ray Biggs") is associated with the Opportunity Management development model, which may be associated with objectives and constraints, such as discussed above with respect to FIG. 4 (e.g., elements 446, 454, 450, 452). In particular, it may be seen that under the heading of constraints, a property for resources (e.g., salespersons) available in Chicago in the referenced time period may be set as a constraint associated with performing a particular task of the Opportunity Management development model 603.

In particular, a portion of the development model is illustrated in which a start process 604 leads to a lead creation task 606, which after a split 607 leads to a lead qualification task 608, thence to a lead handover task 610, and finally to a task 612 for lead customer quote acceptance/rejection. In a properties tab 614, annotations may be set for the modification constraints associated with the number of employees (resources) associated with the task 612, as indicated by the highlighting of the task 612 and the appearance of the associated properties tab 614.

As shown in the property tab 614, information such as a name, start/end time, and working time unit may be set. Constraints for a minimum number of employees (4) and a maximum number of employees (8) are set, and a min/max working time of 8 hours also may be set.

It will be appreciated from the example of FIG. 6 that the simulation is illustrated in terms of the original development model, using the techniques described herein. The developer, however, need not be aware of the details of operation of, e.g., the system 100.

Figure 7:
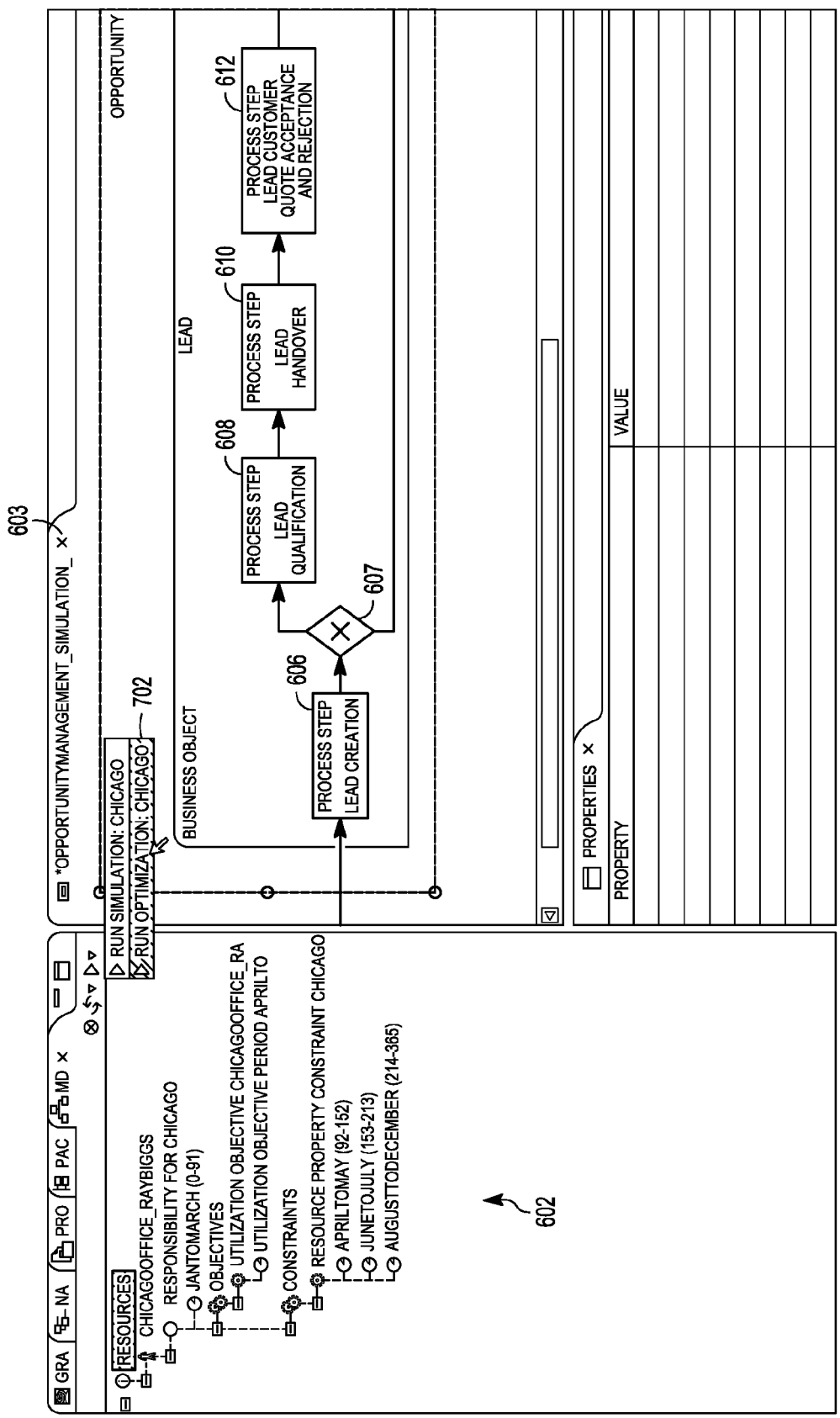
FIG. 7 is a second screenshot illustrating a first example implementation of the system of FIG. 1.

FIG. 7 is a second screenshot illustrating a first example implementation of the system of FIG. 1. FIG. 7 continues the example of FIG. 6, in which a window 702 provides for a triggering of an optimization (e.g., performance assessment) of the simulation of FIG. 6.

Figure 8:
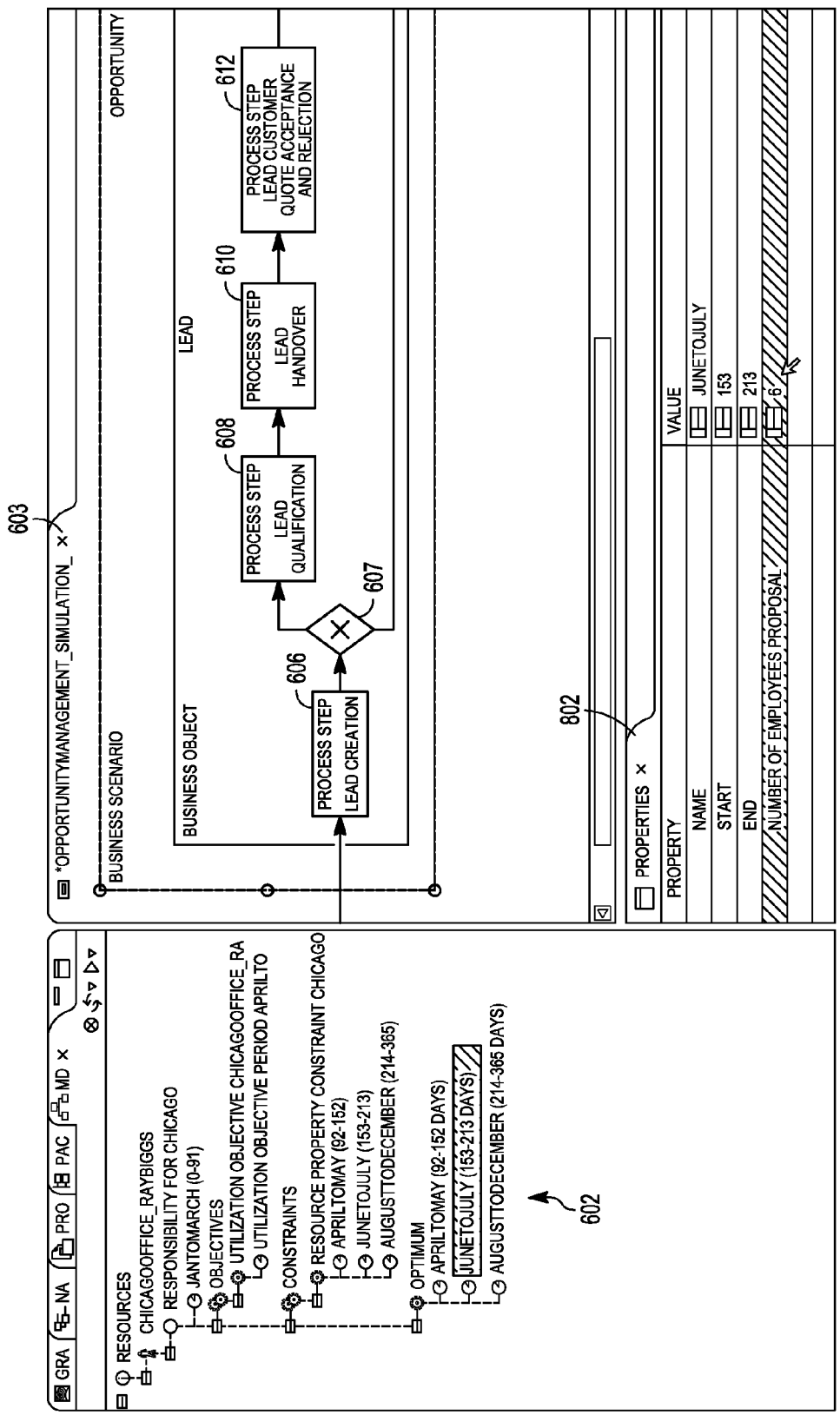
FIG. 8 is a third screenshot illustrating a first example implementation of the system of FIG. 1.

FIG. 8 is a third screenshot illustrating a first example implementation of the system of FIG. 1. In FIG. 8, window 802 illustrates an optimization for the lead customer quote acceptance/rejection task 612, illustrated as an 'optimum' option within the section 602, as shown. In the optimization, 6 employees are suggested for the referenced time frame within June/July, as an optimization. For example, such an optimization may allow completion of the task in a required time frame, while still freeing 2 of the available 8 employees for some other task of the development model.

Figure 9:
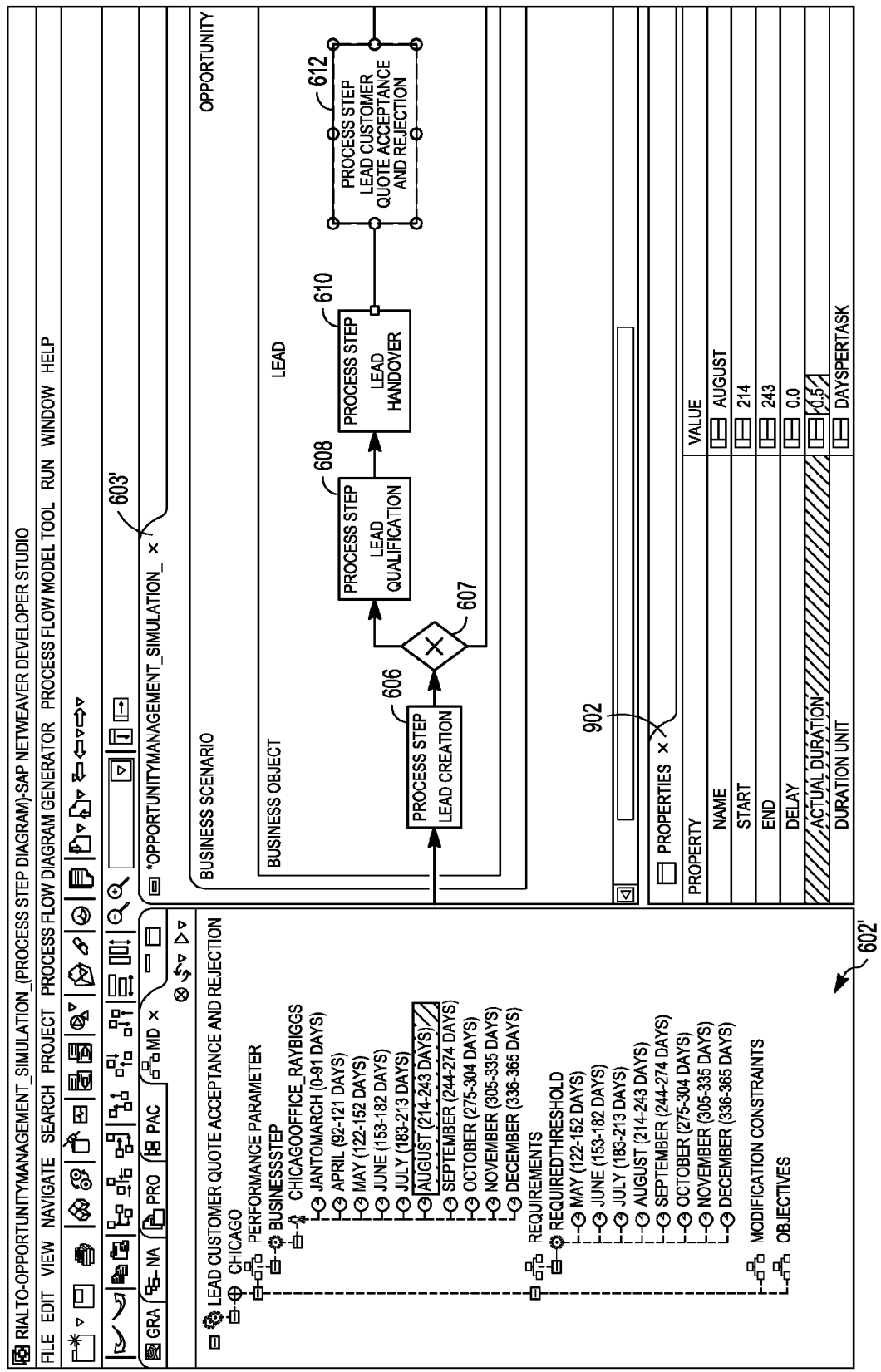
FIG. 9 is a first screenshot illustrating a second example implementation of the system of FIG. 1.

FIG. 9 is a first screenshot illustrating a second example implementation of the system of FIG. 1. In FIG. 9, the example(s) of FIG. 6-8 continue, in which performance parameters and requirements are annotated to the development model using composition models as described herein. For example, FIG. 9 is related to adding requirements such as those discussed above with respect to FIG. 4 (e.g., elements 448, 452).

Figure 10:
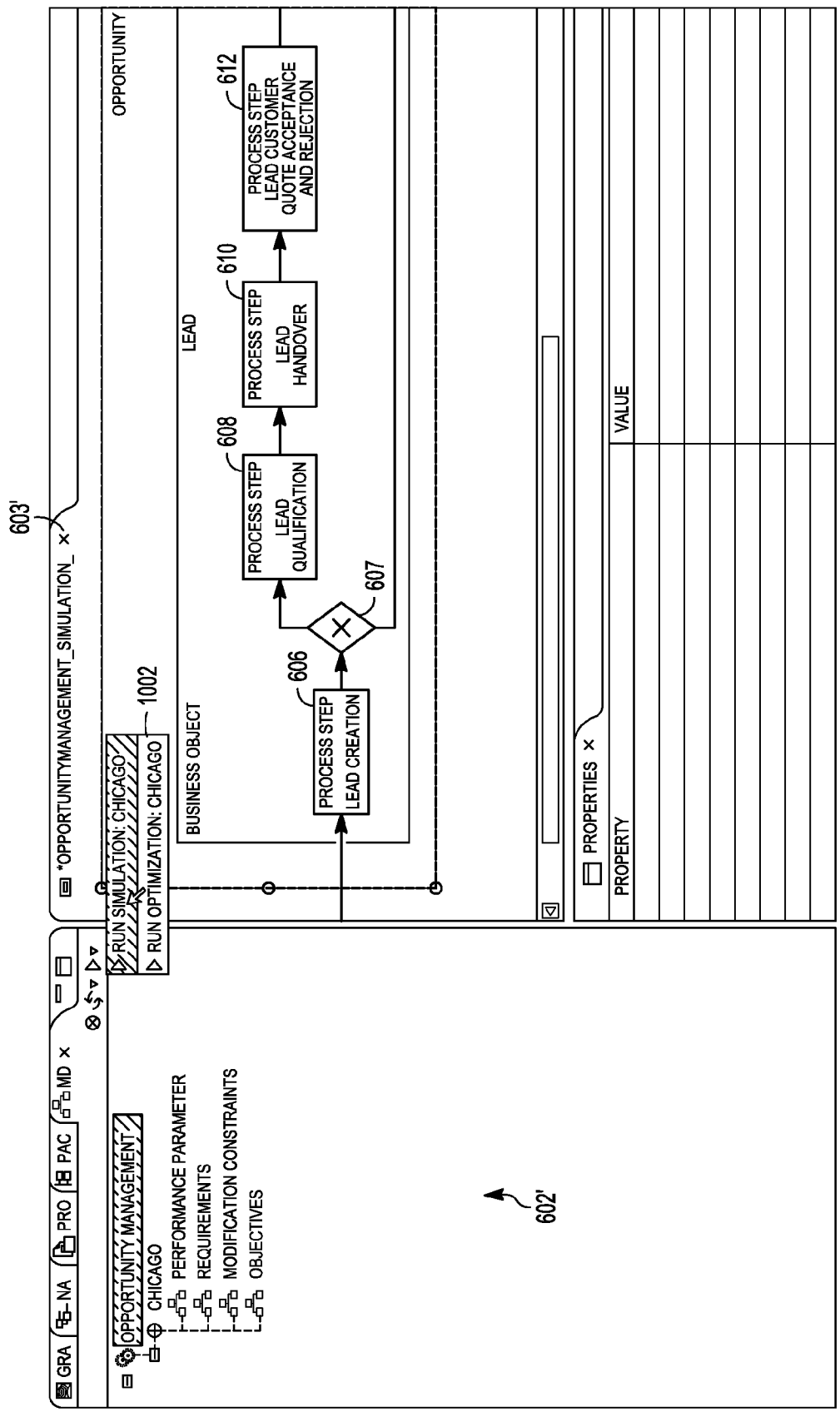
FIG. 10 is a second screenshot illustrating a second example implementation of the system of FIG. 1.

In the example of FIG. 9, section 602' illustrates the requirement(s) thresholds as a relevant performance parameter. A section 902 illustrates the relevant annotation, e.g., in which relevant information including a time frame and task duration are illustrated. In FIG. 10, a window 1002 provides the developer the opportunity to run a simulation of the relevant development model with the stated requirements in place (e.g., trigger the transformation chain and execute performance assessment to see if the stated requirements are passed or if they fail). For example, as shown, the requirement may include a duration of 0.5 days for the task 612 within the stated time period.

Figure 11:
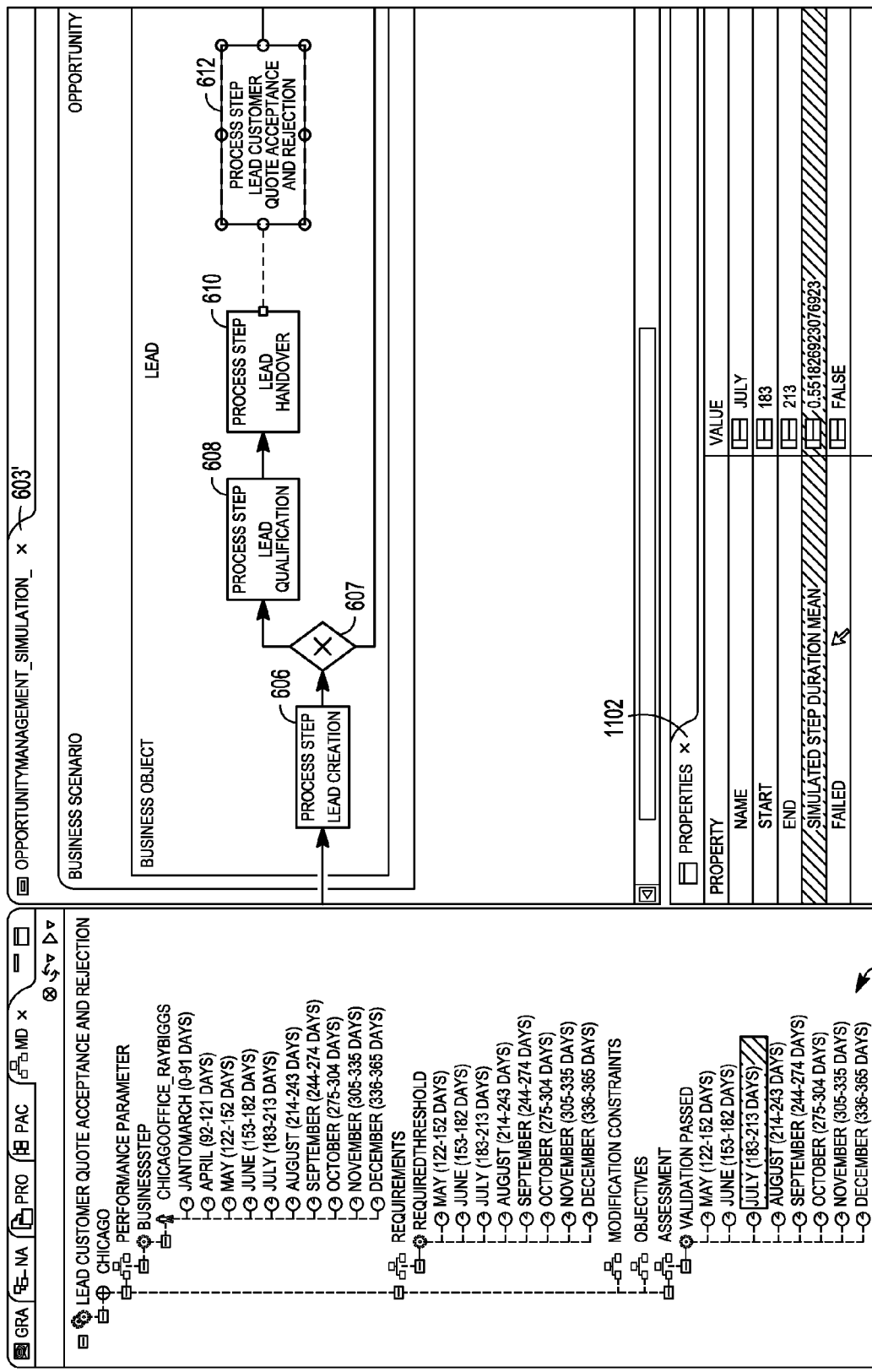
FIG. 11 is a third screenshot illustrating a second example implementation of the system of FIG. 1.

Then, in FIG. 11, tab 602' illustrates the assessment validation that is illustrated in tab 1102. Specifically, tab 1102 illustrates that the simulated step duration mean is approximately 0.55 and therefore the required duration of 0.5 days is passed (i.e., not failed as shown).

FIG. 12 is a screenshot illustrating a portion of a meta-model 1200 for the composition model 124 of FIG. 1. Although the composition model 124 is referenced as such, it is apparent from the above description that the composition model 124 also includes relevant annotations that may be placed there using the techniques of FIG. 2.

In FIG. 12, the meta-model 1200 is shown as including a modification constraints package 1202 in which an existing an publically available link model known as the Wmodel (AMW weaving model) may be used to provide links between the annotations and their corresponding elements of the underlying development model, as well as portion 1204 for modification constrain annotations.

It can be seen that the meta-model 1200 allows an annotation of RessourceDemandsConstraint Annotations and RessourceMappingConstraint Annotations as referenced above. The Composition part of the meta-model 1200 may be defined in the AMW weaving model from which the Modification Constraint Annotation and Composition Model inherit. The Composition part simply allows defining associations (links) between Source Model elements and the actual annotations.

Figure 14:
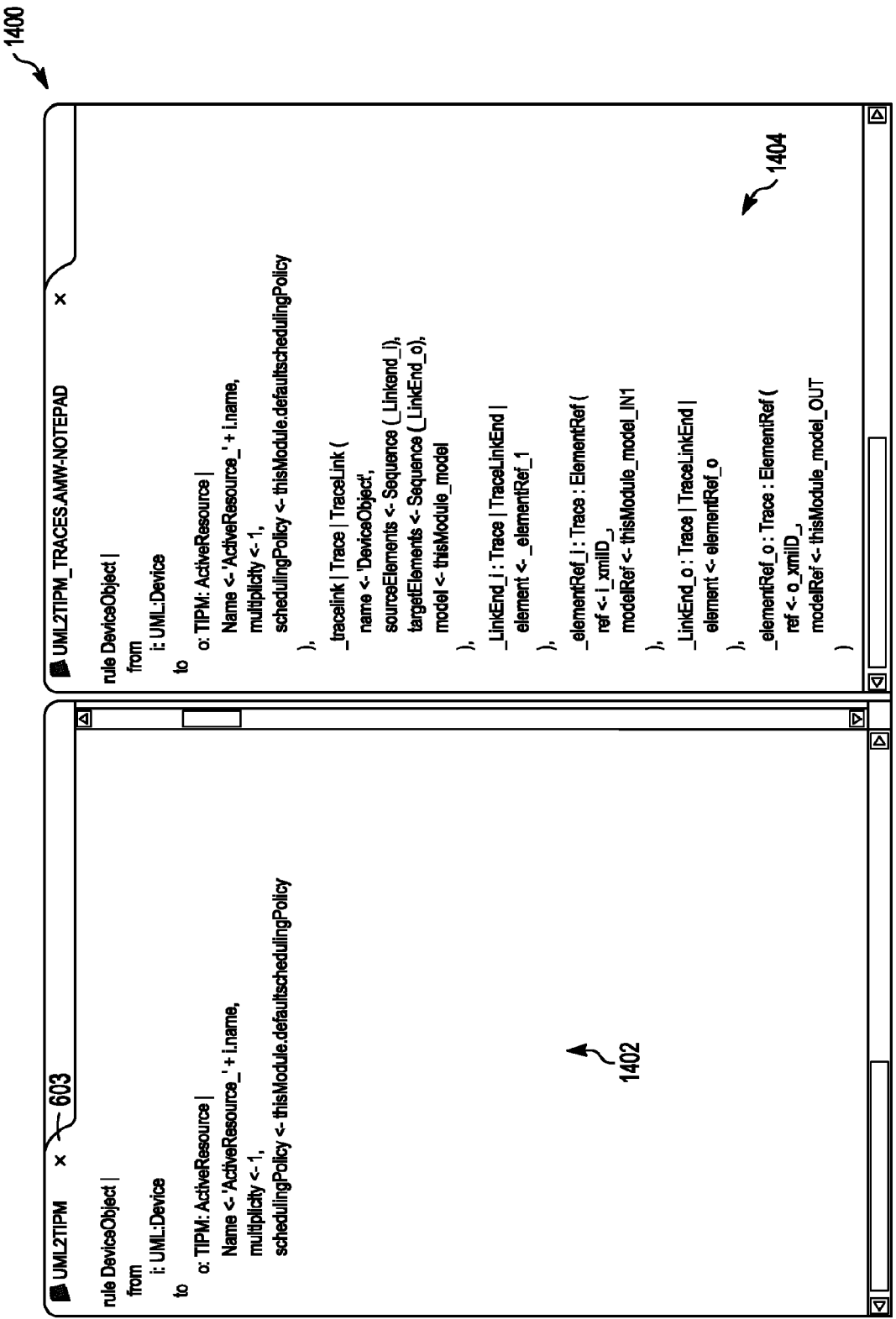
FIG. 14 is a screenshot of an example transformation rule for a transformation engine, extended to generate tracing information for a trace model.

FIG. 13A provides an example instance 1300 for the meta-model 1200 of FIG. 12 (i.e., a modification constraint model of the meta-model 1200). FIG. 13A illustrates the modification constraints as shown in FIG. 13b in table 1300'. FIG. 13A illustrates an example instance in which parameters such as resource mapping constraints (e.g., mapping employees to tasks) and resource demands constraints are set. For example, as shown in the example of FIG. 13B as output of FIG. 13A, table 1300' may illustrate that departments 'customer,' 'sales processing,' and 'production' may be associated with min/max numbers of employees for a particular task as 50/50, 20/20, and 15/17, respectively. The resource demands constraints may then be used to set whether these min/max values are fixed or changeable FIG. 14 is a screenshot 1400 of an example transformation rule for a transformation engine, extended to generate tracing information for a trace model. In particular, portion 1402 illustrates a transformation portion, while portion 1404 illustrates a trace portion for the tracing model.

More specifically, for tracing, High-Order Transformations (HOT) may be used to automatically extend the transformations of the various transformation engines to obtain the resulting trace model. In general, as described, a model transformation takes as input a model conforming to a given extension metamodel and produces as output another model conforming to a given metamodel. One of the characteristic of a model transformation is that a transformation is also a model, i.e. it conforms to a given metamodel. This facilitates the definition of Higher Order Transformations (HOTs), i.e. transformations taking other transformations as input and/or transformations producing other transformations as output.

Hence, HOTs may be considered as transformations that are used to transform one transformation A to a new transformation A'. This approach may be used to automatically extend rules, for instance within ATL transformations, with code for additional information generation. This code creates a trace model when the transformation is executed.

FIG. 14 depicts how, for instance, the rule \DeviceObject" in the transformation from UML to TIPM (see center of portion 1402 of FIG. 14) may be extended with traceability model generation capabilities. Hence, tracing can be achieved with minimal additional effort via HOTs. The result, as shown in portion 1404, includes trace models are provided which link source elements of a source/input model to resulting elements of a transformed/output model of a transformation engines.

Figure 15:
FIG. 15 is a screenshot of an example trace model that may be used in the examples of FIGS. 1 and 4.

FIG. 15 provides an example trace model generated by the UML to TIPM transformation of the transformation engine 422 of FIG. 4. The transformations may additionally be extended so that they update the M2M Navigation Model 134 storing associations between trace models and the related source and target models in a Transformation Chain. An example M2M Navigation Model may be generated by modifying existing transformations via HOTs in the same way as above to generate the tracing models. The M2M Navigation Model 134 may thus be used in order to navigate from source and target models in a Transformation Chain to its trace model since to avoid polluting the models by adding this linkage information.

As described, then, the assessment engine 150 or 460, or the transformation engine 116, 422, each may need to relate elements of a simulation or other transformation and relate these elements to the original elements of the source/development model(s). Hence, a mechanism is needed in order to associate the model annotations done based on original Source Models with the result of the possibly long transformation chain. This information may be obtained by implementing the following algorithm:

Algorithm 1

```
main( ){
Array<Annotation> annotations =
getAllAnnotationsFromCompositionModel( );
for(Annotation currentAnnotation : annotations){
SourceModelElement sElement =
getSourceModelElementOfAnnotation
(currentannotation);
TargetElement tElement =
getTargetElementAfterTransformationChain
ForSourceElement(sElement, currentModel);
//Now, the annotation can be associated with a target model
//element after a Transformation Chain.
}
//recursive method is going through the trace models in the
//Transformation Chain
ModeElement
getTargetElementAfterTransformationChainForSourceElement
(ModelElement sourceElement, Model currentModel){
TracingModel tModel =
getTracingModelOfModelFromM2MNavigationModel
(sourceElement.getParentModel( ));
ModelElement targetModelElement =
tModel.getTargetElementFromSource
Element(sourceElement);
If(targetModelElement.getParentModel( ) typeof currentModel)
return targetModelElement;
else
return
getTargetElementAfterTransformationChainForSourceElement
(targetModelElement, currentModel);
}
```

In general, Algorithm 1 provides for a recursive technique in which simulation results are related back to the development models using a recursive techniques and "back-tracking" through the various trace models, using the M2M navigation model, as shown in Algorithm 1. When using an ATL transformation (such as in transformation engine 422 and possible 116) this code may be embedded in the functional part of ATL code in case "back-tracking" is needed. In other cases, such as in the assessment engine(s) 150/460 Algorithm 1 may be written, for example, as Java code.

The algorithm above can also be used in order to generate a direct trace model between a assessment model, e.g. storing simulation or optimization results, and development model elements needs to be generated.

The algorithm provides for associating the annotations defined based on the Source Models with the target models after a possibly long transformation chain. The algorithm may thus be useful in case a related target model element is available for the annotated source model element. If this is not the case, then the developer 102 (as a modeling domain specialist) may be informed using the GUI 140 that the annotation will not be useful for the purpose(s) of the developer 102.

With reference back to FIG. 4, it is described above for transformation engine 422 that performance parameter annotations in the transformation step from UML model 420 to TIPM 424. Hence, this transformation receives UML model 420 as the input model, as shown and described. The Performance Annotations may be executed based on the original Source Model (e.g., models 302 and 304 of model 300). With help of Algorithm 1, the transformation from UML to TIPM can compute which UML Model Element is associated with the model element in the Source Model. Therefore, the annotations, may directly be associated with UML Model Elements.

Thus, the referenced UML to TIPM transformation works in the same way as it would work if all annotations were transformed with additional effort through the possibly long transformation chain, and which requires direct changes of all models in the chain, including the original Source Model, but without requiring such changes. In the example of the assessment engine 460, it may be desired to compute the Performance Assessment View 462, such as the computation of an optimal configuration. Hence, it may be necessary/useful to compute the optimal number of resources for the departments which are involved. Thus, the performance assessment computation may be required to simulate multiple options within the solution space.

The Performance Assessment Computation may be based on the TIPM as described above. Performance Assessment Computation may thus be used to assess the simulation result conforming to the Performance Objectives and to eventually try out more configurations by taking the Modification Constraints and Performance Requirements into account which are restricting the solution space. The Modification Constraints and Performance Requirements and Objectives are loosely annotated based on the original Source Models. Since the Performance Assessment Computation is based on the TIPM, which can be simulated as shown above, it needs more knowledge about which model elements in the TIPM are associated with the Modification Constraints and Performance Requirements and Objectives.

As described, the techniques of the present description may be provided to enable developers to only compute the annotated information for those steps in a Transformation Chain where the annotated data are needed, and to relate that data back to the original development/source model, as needed.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer-readable storage medium and executable by at least one processor, the system comprising an annotation engine configured to cause the at least one processor to input a development model of a software application and associate annotations with elements of the development model, and configured to provide links between each annotation and its associated element to thereby output a composition model;

a transformation manager configured to cause the at least one processor to coordinate at least two transformation engines within a transformation chain, each transformation engine associated with an input model and a transformed model, wherein at least one of the transformation engines is configured to receive the composition model in association with a corresponding input model and output an annotated, transformed model based thereon;

a trace model manager configured to cause the at least one processor to coordinate at least two trace model generators for generating trace models, each trace model associated with a corresponding transformation engine and relating source elements of a corresponding input model to target elements of a corresponding transformed model, wherein the trace model manager is configured to track and store a relationship between each of the at least two trace models and each corresponding input model and transformed model; and a simulation manager configured to cause the at least one processor to execute a simulator associated with one of the at least two transformation engines and configured to receive a corresponding transformed model therefrom as a simulation model, based on the annotated, transformed model, and configured to output a simulation of the simulation model including simulation results;

wherein the trace manager is configured to link elements of the simulation of the simulation model with elements of the development model, using the stored relationships, to thereby provide a simulation of the development model in which the simulation results are displayed in conjunction with the development model.

2. The system of claim 1 wherein the trace manager is configured to execute a model-to-model (M2M) navigation model tracking relationships between the trace models and their respective source elements and target elements, and configured to associate the elements of the simulation with elements of the development model based thereon.

3. The system of claim 1 wherein the annotations include performance annotations characterizing a performance of the development model.

4. The system of claim 3 wherein performance data of the composition model is obtained from one or both of an actual or simulated execution of the development model.

5. The system of claim 3 wherein the simulation represents execution of the development model with respect to the performance parameters.

6. The system of claim 3 comprising:
an assessment engine configured to determine optimizations of the simulation results, based on one or more decision support models.

7. The system of claim 1 wherein the development model includes nodes and branches joining the nodes to define an execution of the software application.

8. The system of claim 1 wherein at least one transformation engine is configured to implement one of the at least two trace model generators and thereby to generate an associated trace model in conjunction with performing the transformation of the associated input and transformed model, based on a transformation model of the at least one transformation engine.

9. A computer program product tangibly embodied on a non-transitory computer-readable medium and including executable code that, when executed, is configured to cause at least one data processing apparatus to:

input a development model of a software application and associate annotations with elements of the development model, and provide links between each annotation and its associated element to obtain a composition model;

coordinate at least two transformation engines within a transformation chain, each transformation engine associated with an input model and a transformed model, wherein at least one of the transformation engines is configured to receive the composition model in association with a corresponding input model and output an annotated, transformed model based thereon;

coordinate at least two trace model generators for generating trace models, each trace model associated with a corresponding transformation engine and relating source elements of a corresponding input model to target elements of a corresponding transformed model;

track and store relationships between each of the at least two trace models and each corresponding input model and transformed model;

execute a simulator associated with one of the at least two transformation engines and configured to receive a corresponding transformed model therefrom as a simulation model, based on the annotated, transformed model, and configured to output a simulation of the simulation model including simulation results;

link elements of the simulation of the simulation model with elements of the development model, using the stored relationships; and provide a simulation of the development model in which the simulation results are displayed in conjunction with the development model.

10. The computer program product of claim 9 wherein the relationships are used to associate the elements of the simulation with the elements of the development model, using a model-to-model (M2M) navigation model to track associations between the trace models and their respective source elements and target elements.

11. The computer program product of claim 9 wherein the annotations include performance annotations characterizing a performance of the development model.

12. The computer program product of claim 11 wherein performance data of the composition model is obtained from one or both of an actual or simulated execution of the development model.

13. The computer program product of claim 11 wherein the simulation represents execution of the development model with respect to the performance parameters.

14. The computer program product of claim 11, wherein the executable code, when executed, is configured to determine optimizations of the simulation results, based on one or more decision support models.

15. The computer program product of claim 9 wherein at least one transformation engine is configured to implement one of the at least two trace model generators and thereby to generate an associated trace model in conjunction with performing the transformation of the associated input and transformed model, based on a transformation model of the at least one transformation engine.

16. A method comprising:
receiving a development model of a software application and associate annotations with elements of the development model, and provide links between each annotation and its associated element to obtain a composition model;

coordinating at least two transformation engines within a transformation chain, each transformation engine associated with an input model and a transformed model, wherein at least one of the transformation engines is configured to receive the composition model in association with a corresponding input model and output an annotated, transformed model based thereon;

coordinating at least two trace model generators for generating trace models, each trace model associated with a corresponding transformation engine and relating source elements of a corresponding input model to target elements of a corresponding transformed model;

tracking relationships between each of the at least two trace models and each corresponding input model and transformed model;

executing a simulator associated with one of the at least two transformation engines and configured to receive a corresponding transformed model therefrom as a simulation model, based on the annotated, transformed model, and configured to output a simulation of the simulation model including simulation results;

linking elements of the simulation of the simulation model with elements of the development model, using the stored relationships; and providing a simulation of the development model in which the simulation results are displayed in conjunction with the development model.

17. The method of claim 16 wherein the tracking relationships between each of the at least two trace models and each corresponding input model and transformed model comprises:
using the relationships to associate the elements of the simulation with the elements of the development model, using a model-to-model (M2M) navigation model to track associations between the trace models and their respective source elements and target elements.

18. The method of claim 16 wherein the annotations include performance annotations characterizing a performance of the development model.

19. The method of claim 18 wherein performance data of the composition model is obtained from one or both of an actual or simulated execution of the development model.

20. The method of claim 18, comprising:
determining optimizations of the simulation results, based on one or more decision support models.

* * * * *